(12) United States Patent
Takahashi et al.

(10) Patent No.: US 8,977,266 B2
(45) Date of Patent: Mar. 10, 2015

(54) MOBILE COMMUNICATION SYSTEM

(75) Inventors: Hideaki Takahashi, Yokohama (JP); Wuri Andarmawanti Hapsari, Yokosuka (JP); Anil Umesh, Yokohama (JP); Mikio Iwamura, Tokyo (JP); Minami Ishii, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/266,460

(22) PCT Filed: Apr. 27, 2010

(86) PCT No.: PCT/JP2010/057483
§ 371 (c)(1),
(2), (4) Date: Jan. 10, 2012

(87) PCT Pub. No.: WO2010/126052
PCT Pub. Date: Nov. 4, 2010

(65) Prior Publication Data
US 2012/0115480 A1    May 10, 2012

(30) Foreign Application Priority Data
Apr. 27, 2009  (JP) ................. P2009-108566

(51) Int. Cl.
*H04W 36/00* (2009.01)
*H04W 84/04* (2009.01)

(52) U.S. Cl.
CPC ........ *H04W 36/0055* (2013.01); *H04W 84/047* (2013.01)
USPC ....................................... 455/436

(58) Field of Classification Search
USPC .............................. 455/16, 445, 436; 370/315
See application file for complete search history.

(56) References Cited

U.S. PATENT DOCUMENTS

| | | |
|---|---|---|
| 2007/0153698 A1 | 7/2007 | Lee et al. |
| 2007/0178880 A1 | 8/2007 | Saito et al. |
| 2008/0165776 A1* | 7/2008 | Tao et al. ...................... 370/392 |
| 2010/0027471 A1* | 2/2010 | Palanki et al. ................. 370/328 |
| 2011/0044235 A1* | 2/2011 | Zhang et al. ................... 370/315 |
| 2011/0075633 A1* | 3/2011 | Johansson et al. ............ 370/331 |
| 2012/0002598 A1* | 1/2012 | Seo et al. ....................... 370/315 |

FOREIGN PATENT DOCUMENTS

| | | |
|---|---|---|
| JP | 2008-172757 A | 7/2008 |
| WO | 2007/119168 A2 | 10/2007 |

OTHER PUBLICATIONS

International Search Report w/translation from PCT/JP2010/057483 dated Jul. 6, 2010 (3 pages).

(Continued)

*Primary Examiner* — Kwasi Karikari
(74) *Attorney, Agent, or Firm* — Osha Liang LLP

(57) ABSTRACT

A radio base station includes a mobile communication system, a relay node and a radio base station connected via a radio bearer. A mobile station is configured to perform a handover process between a state in which a radio bearer is set with the relay node so as to communicate via the relay node and the radio base station, and a state in which a radio bearer is set with the radio base station so as to communicate via the radio base station. The handover process is configured such that a data signal is transferred via the radio bearer between the relay node and the radio base station.

8 Claims, 17 Drawing Sheets

(56) References Cited

OTHER PUBLICATIONS

3GPP TSG RAN WG1 #55bis, R1-090290; "On the design of relay node for LTE-advanced"; Texas Instruments; Ljubljana, Slovenia; Jan. 12-16, 2009 (10 pages).

3GPP TS 36.420 V8.1.0; "3rd Generation Partnership Project; Technical Specification Group Radio Access Network; Evolved Universal Terrestrial Radio Access Network (E-UTRAN); X2 general aspects and principles (Release 8)"; Dec. 2008 (12 pages).

3GPP TS 36.401 V8.5.0; "3rd Generation Partnership Project; Technical Specification Group Radio Access Network; Evolved Universal Terrestrial Radio Access Network (E-UTRAN); Architecture description (Release 8)"; Mar. 2009 (19 pages).

3GPP TS 36.300 V8.8.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2009 (157 pages).

Office Action for Korean Patent Application No. 10-2011-7025910 dated Sep. 13, 2012, with English translation thereof (7 pages).

Office Action for Russian Application No. 2011145532/07 dated Oct. 4, 2012, with English translation thereof (6 pages).

Extended European Search Report for European Application No. 10769750.0 dated Nov. 20, 2012 (9 pages).

3GPP TSG RAN WG1 #56, R1-090593, "On the design of relay node for LTE-advanced;" Texas Instruments, Athens, Greece, Feb. 9-13, 2009 (11 pages).

Office Action issued in corresponding Canadian Application No. 2760432, mailed Nov. 25, 2013 (3 pages).

\* cited by examiner

FIG. 2
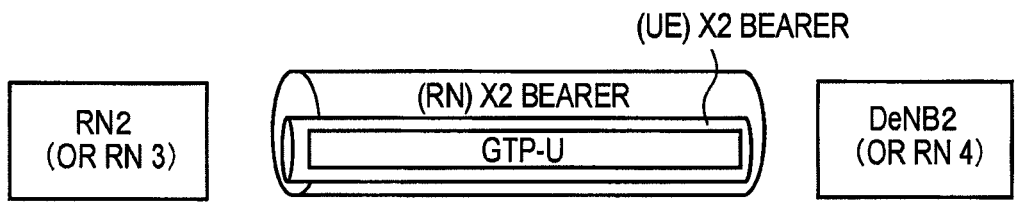
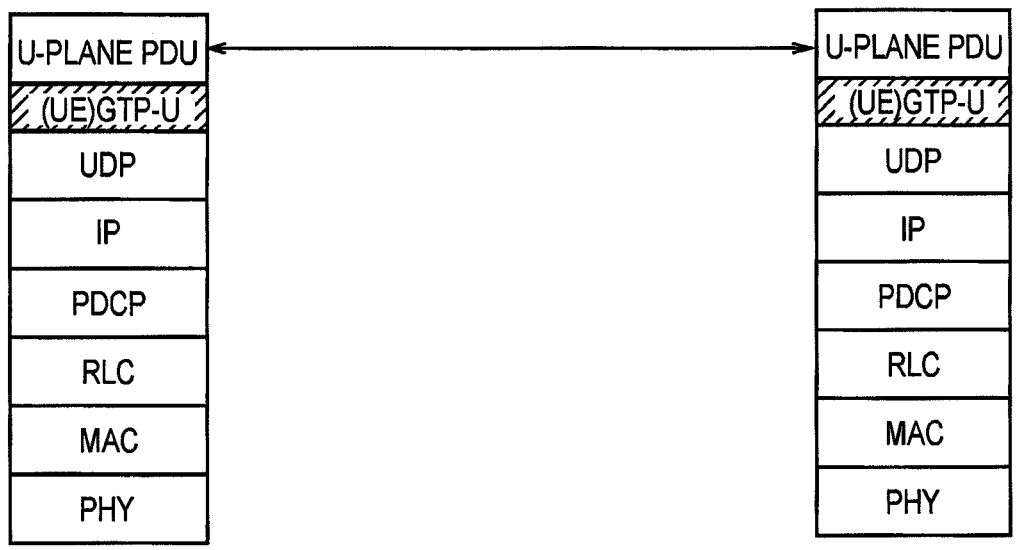
FIG. 3
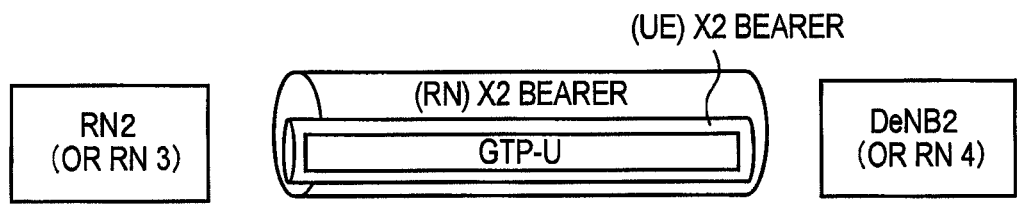
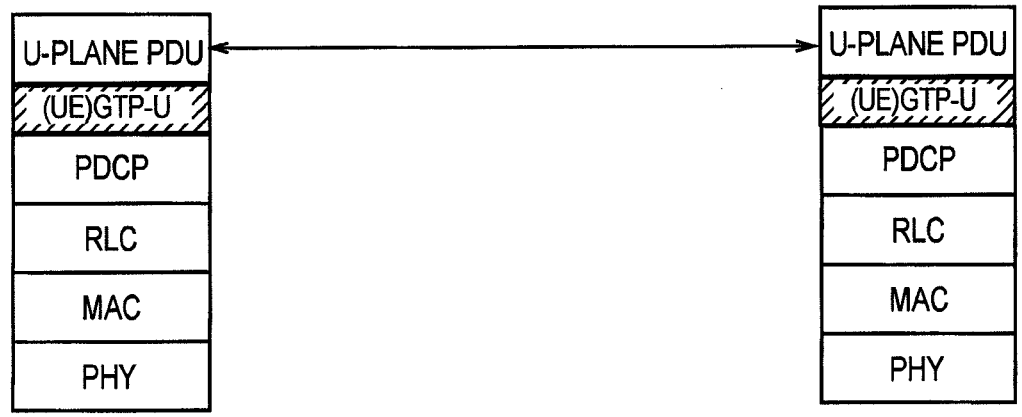

MOBILE COMMUNICATION SYSTEM

BACKGROUND OF INVENTION

1. Technical Field

The present invention relates to a mobile communication system.

2. Background Art

A mobile communication system of the LTE scheme (Release.8) defined by the 3GPP, as illustrated in FIG. 18, is configured such that when a handover process of a mobile station UE is carried out from a radio base station eNB#1 to a radio base station eNB#2, an X2 bearer is set between the radio base station eNB#1 and the radio base station eNB#2 in order for a U-plane PDU (Protocol Data Unit) to be transferred from the radio base station eNB#1 to the radio base station eNB#2 via the X2 bearer.

The radio base station eNB#1 and the radio base station eNB#2, as illustrated in FIG. 18, include network layer 1/2 (NW L1/L2) functions, an IP (Internet Protocol) layer function, a UDP (User Datagram Protocol) layer function, and a GTP (GPRS Tunneling Protocol)-U layer function, as X2 bearer functions configured to set the above-mentioned X2 bearer.

PRIOR ART DOCUMENTS

Non-Patent Documents

Non-patent Document 1:
3GPP TS36.300 (V8.8.0), "Evolved Universal Terrestrial Radio Access (E-UTRA) and Evolved Universal Terrestrial Radio Access Network (E-UTRAN) Physical Channels", March 2009

Non-patent Document 2:
3GPP TS36.401 (V8.5.0), "Evolved Universal Terrestrial Radio Access (E-UTRA) and Evolved Universal Terrestrial Radio Access Network (E-UTRAN) Architecture description", March 2009

Non-patent Document 3:
3GPP TS36.420 (V8.1.0), "Evolved Universal Terrestrial Radio Access (E-UTRA) and Evolved Universal Terrestrial Radio Access Network (E-UTRAN) X2 General aspects and principles", December 2008

In an LTE-Advanced mobile communication system, which is the communication scheme that is the next-generation of the LTE scheme, "relay nodes RN" including the same functions as a radio base station eNB can establish connections between a mobile station UE and a radio base station eNB.

However, the conventional mobile communication system been problematic in that there is no regulation for how handover processes of the mobile station UE are to be handled when the relay nodes RN have been connected.

SUMMARY OF INVENTION

One or more embodiments of the present invention may provide a mobile communication system capable of also implementing handover processes by a mobile station when relay nodes have been connected.

The first feature of the present invention is summarized in that a mobile communication system, a relay node and a radio base station are connected via a radio bearer, a mobile station is configured to perform a handover process between a state in which a radio bearer is set with the relay node so as to communicate via the relay node and the radio base station, and a state in which a radio bearer is set with the radio base station so as to communicate via the radio base station, and the handover process is configured such that a data signal is transferred via the radio bearer between the relay node and the radio base station.

The second feature of the present invention is summarized in that a mobile communication system, a relay node and a first radio base station are connected via a radio bearer, the first radio base station and a second radio base station are connected, a mobile station is configured to perform a handover process between a state in which a radio bearer is set with the relay node so as to communicate via the relay node and the first radio base station, and a state in which a radio bearer is set with the second radio base station so as to communicate via the second radio base station, and the handover process is configured such that a data signal is transferred via the radio bearer between the relay node and the second radio base station.

The third feature of the present invention is summarized in that a mobile communication system, a first relay node and a first radio base station are connected via a radio bearer, a second relay node and a second radio base station are connected via a radio bearer, the first radio base station and the second radio base station are connected, a mobile station is configured to perform a handover process between a state in which a radio bearer is set with the first relay node so as to communicate via the first relay node and the first radio base station, and a state in which a radio bearer is set with the second relay node so as to communicate via the second relay node and the second radio base station, and the handover process is configured such that a data signal is transferred via a radio bearer between the first relay node and the second relay node.

The fourth feature of the present invention is summarized in that a mobile communication system, a first relay node and a radio base station are connected via a radio bearer, a second relay node and a radio base station are connected via a radio bearer, a mobile station is configured to perform a handover process between a state in which a radio bearer is set with the first relay node so as to communicate via the first relay node and the radio base station, and a state in which a radio bearer is set with the second relay node so as to communicate via the second relay node and the radio base station, and the handover process is configured such that a data signal is transferred via a radio bearer between the first relay node and the second relay node.

The fifth feature of the present invention is summarized in that a mobile communication system, a first relay node and a second relay node are connected via a radio bearer, a second relay node and a radio base station are connected via a radio bearer, a mobile station is configured to perform a handover processes between a state in which a radio bearer is set with the first relay node so as to communicate via the first relay node, the second relay node, and the radio base station, and the state in which a radio bearer is set with the second relay node so as to communicate via the second relay node and the radio base station, and the handover process is configured such that a data signal is transferred via the radio bearer between the first relay node and the second relay node.

The sixth feature of the present invention is summarized in that a mobile communication system, a first relay node and a second relay node are connected via a radio bearer, a second relay node and a radio base station are connected via a radio bearer, a mobile station is configured to perform a handover process between a state in which a radio bearer is set with the first relay node so as to communicate via the first relay node, the second relay node, and the radio base station, and a state in which a radio bearer is set with the radio base station so as to communicate via the radio base station, and the handover process is configured such that a data signal is transferred via a radio bearer between the first relay node and the radio base station.

As has been described above, according to the present invention, it is possible to provide a mobile communication system capable of also implementing handover processes by a mobile station when relay nodes have been connected.

BRIEF DESCRIPTION OF THE DRAWINGS

FIG. 2 is a diagram showing the protocol stack of the mobile communication system according to the first embodiment of the present invention.

FIG. 3 is a diagram showing the protocol stack of the mobile communication system according to the first modification of the first embodiment of the present invention.

DETAILED DESCRIPTION

Figure 1:
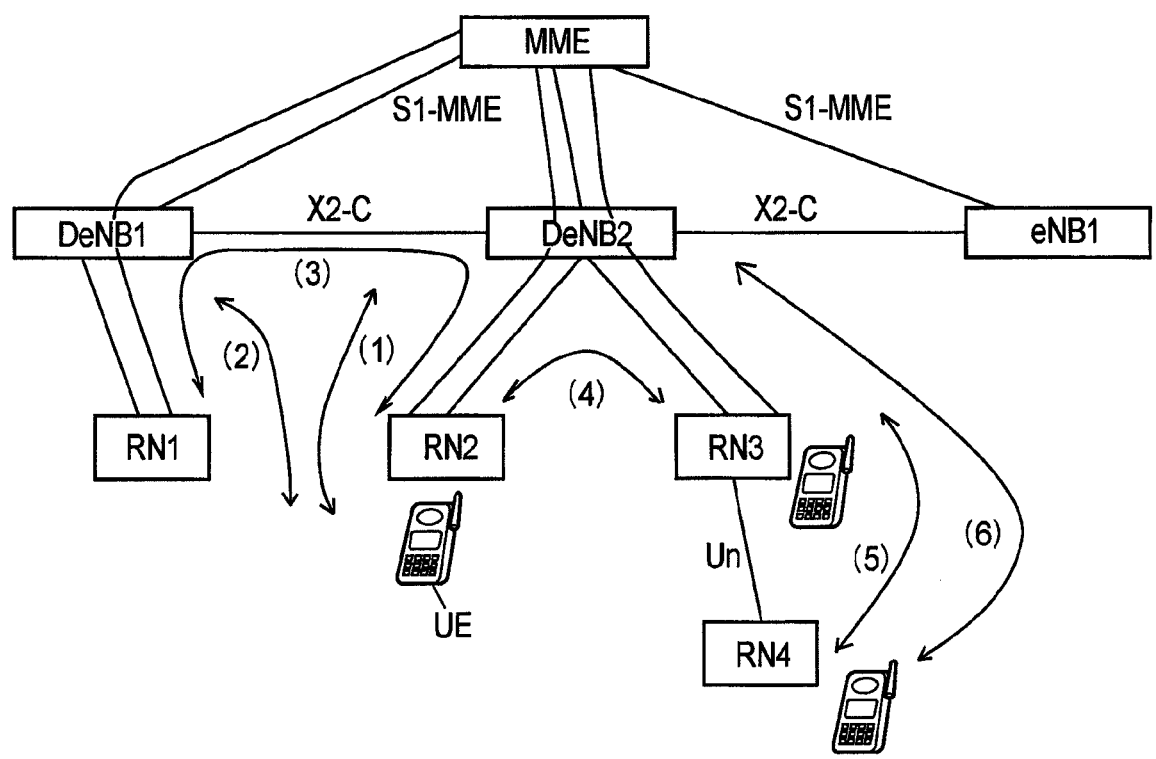
FIG. 1 is a diagram showing the entire configuration of the mobile communication system according to a first embodiment of the present invention.

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. The mobile communication system according to the present invention is an LTE-Advanced mobile communication system including, for example, as illustrated in FIG. 1, a mobile switching center MME, relay nodes RN1 to RN4, a radio base station DeNB (Donor eNB)1 that is connected to the relay node RN1, a radio base station DeNB2 that is connected to the relay nodes RN2 and RN3, and a radio base station eNB1.

Herein, the radio base station DeNB1 and the radio base station DeNB2 are connected via an X2-C interface, and the radio base station DeNB2 and the radio base station eNB1 are connected via an X2-C interface.

Also, the radio base station DeNB1, the radio base station DeNB2, and the radio base station eNB1 are respectively connected with the mobile switching center MME via S1-MME interfaces.

In such a mobile communication system, the mobile station UE is configured to set a radio bearer between the radio base stations eNB (DeNB) and the relay nodes RN in order to perform radio communication.

Further, the mobile station UE is configured to be able to perform handover processes between a state in which a radio bearer is set with a specific apparatus (a radio base station or relay node) so as to communicate, and a state in which a radio bearer is set with another apparatus (a radio base station or relay node) so as to communicate.

A description is provided below, with reference to FIG. 2 to FIG. 16, for the configuration of the X2 bearer when the mobile station UE carries out the handover process of the pattern illustrated by (1) to (6) of FIG. 1.

(First Embodiment of the Present Invention)

A description is provided with reference to FIG. 2 for the configuration of the X2 bearer in a first embodiment of the present invention when the handover process of the pattern illustrated by (1) and (5) mentioned above is carried out.

For example, as illustrated in FIG. 1, in the pattern (1), the mobile station UE is configured to carry out handover processes between a state in which a radio bearer is set with the relay node RN2 so as to communicate via the relay node RN2 and the radio base station DeNB2, and the state in which a radio bearer is set with the radio bearer DeNB2 so as to communicate via the radio base station DeNB2.

Further, as illustrated in FIG. 1, in the pattern (5), the mobile station UE is configured to perform handover processes between a state in which a radio bearer is set with the relay node RN4 (the first relay node) so as to communicate via the relay node RN4, the relay node RN3 (the second relay nodes), and the radio base station DeNB2, and the state in which a radio bearer is set with the relay node RN3 so as to communicate via the relay node RN3 and the radio base station DeNB2.

As illustrated in FIG. 2, the handover process of the pattern (1) is configured such that a data signal (U-plane PDU (Protocol Data Unit)) is transferred via the X2 bearer for the mobile station UE, the "(UE) X2 bearer (radio bearer)", that is multiplexed in the X2 bearer for the relay nodes RN, the "(RN) X2 bearer", between the relay node RN2 and the radio base station DeNB2.

Also, the handover process of the pattern (5) is configured such that a data signal (U-plane PDU) is transferred via the X2 bearer for the mobile station UE, the "(UE) X2 bearer", that is multiplexed in the X2 bearer for the relay nodes RN, the "(RN) X2 bearer", between the relay node RN4 and the relay node RN3.

Herein, the X2 bearer for the relay nodes RN, the "(RN) X2 bearer", is set for each QoS (Quality of Service). Note that the QoS is intended to be set for each communication performed by the mobile station UE, for example.

Further, the relay node RN2 and the radio base station DeNB2, or alternatively the relay node RN3 and the relay node RN4 include a physical (PHY) layer function as an X2 bearer function for the relay nodes RN in order to set the X2 bearer for the relay nodes RN, the "(RN) X2 bearer", and an MAC (Media Access Control) layer function provided as an upper layer function of the physical (PHY) layer function, an RLC (Radio Link Control) layer function provided as an upper layer function of the MAC layer function, and a PDCP (Packet Data Convergence Protocol) layer function provided as an upper layer function of the RLC layer function.

Furthermore, the relay node RN2 and the radio base station DeNB2, or alternatively the relay node RN3 and the relay node RN4 include an IP layer function provided as an upper layer function of the X2 bearer function for the relay nodes RN, a UDP layer function provided as an upper layer function of the IP layer function, and a (UE) GTP-U layer function provided as an upper layer function of the UDP layer function.

Herein, the (UE) GTP-U layer function is configured to set the X2 bearer for the mobile station UE, the "(UE) X2 bearer", between the relay node RN2 and the radio base station DeNB2.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, between the radio base station DeNB2 and the relay node RN2, or alternatively between the relay node RN3 and the relay node RN4, it is not necessary to set a number of X2 bearers for the relay nodes RN, the "(RN) X2 bearers", corresponding to the number of mobile stations UE in communication.

Further, according to the mobile communication system of this embodiment, at the time of the handover process of the mobile station UE, there is no need to set an X2 bearer for the relay nodes RN, the "(RN) X2 bearer", between the radio base station DeNB2 and the relay node RN2, or alternatively between the relay node RN3 and the relay node RN4, and therefore the handover process can be executed quickly.

(First Modification of the First Embodiment of the Present Invention)

A description will be provided with reference to FIG. 3 for the configuration of the X2 bearer in a first modification of the first embodiment of the present invention when a handover process of the pattern illustrated by (1) and (5) mentioned above is performed. Below, this first modification is described by focusing on the points of difference from the first embodiment described above.

In this first modification as well, the X2 bearer for the relay nodes RN, the "(RN) X2 bearer", is set for each QoS.

Also, the relay node RN2 and the radio base station DeNB2, or alternatively the relay node RN3 and the relay node RN4 include a (UE) GTP-U layer function provided as an upper layer function of the X2 bear function for the relay nodes RN.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, between the radio base station DeNB2 and the relay node RN2, or alternatively between the relay node RN3 and the relay node RN4, it is not necessary to set a number of X2 bearers for the relay nodes RN, the "(RN) X2 bearers", corresponding to the number of mobile stations UE in communication.

Further, according to the mobile communication system of this embodiment, at the time of the handover process of the mobile station UE, there is no need to set an X2 bearer for the relay nodes RN, the "(RN) X2 bearer", between the radio base station DeNB2 and the relay node RN2, or alternatively between the relay node RN3 and the relay node RN4, and therefore the handover process can be executed quickly.

(Second Modification of the First Embodiment of the Present Invention)

Figure 4:
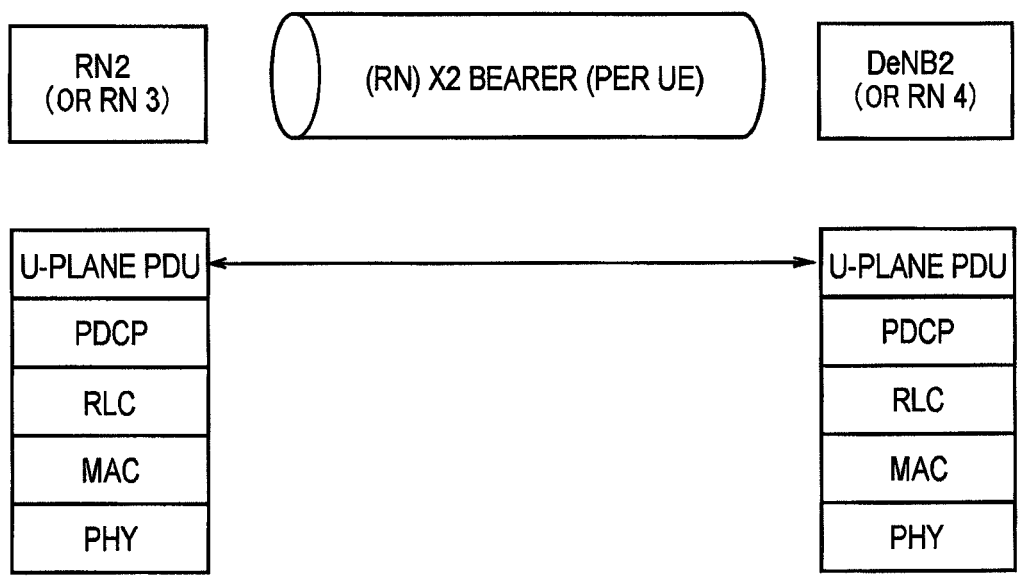
FIG. 4 is a diagram showing the protocol stack of the mobile communication system according to a second modification of the first embodiment of the present invention.

A description will be provided with reference to FIG. 4 for the configuration of the X2 bearer in a second modification of the first embodiment of the present invention when a handover process of the pattern illustrated by (1) and (5) mentioned above is performed. Below, this second modification is described by focusing on the points of difference from the first embodiment described above.

In this second modification, an X2 bearer for the relay nodes RN, the "(RN) X2 bearer (per UE)", is set in each mobile station UE and for each QoS.

Also, the relay node RN2 and the radio base station DeNB2, or alternatively the relay node RN3 and the relay node RN4 are not provided with a (UE) GTP-U layer function as an upper layer function of the X2 bearer function for the relay nodes RN, and the handover process is configured such that a data signal (U-plane PDU) is sent over the X2 bearer for the relay nodes RN, the "(RN) X2 bearer (per UE)".

According to the mobile communication system of this embodiment, it is possible to implement a handover process involving the relay nodes RN without performing a major renovation of the protocol stack of each device used in the LTE mobile communication system.

Also, according to the mobile communication system of this embodiment, the overhead assigned to the data signal (U-plane PDU) between the radio base station DeNB2 and the relay node RN2, or alternatively the relay node RN3 and the relay node RN3, can be reduced.

Moreover, according to the mobile communication system of this embodiment, at the time of the handover process of the mobile station UE, the priority of each mobile station on the X2 bearer for the relay nodes RN, the "(RN) X2 bearer", can be controlled.

(Third Modification of the First Embodiment of the Present Invention)

In a third modification of the first embodiment of the present invention, the handover process of the pattern illustrated by (1) and (5) mentioned above is configured such that the data signal (U-plane PDU) is transferred via an S1 bearer instead of via the X2 bearer described above.

In other words, the mobile communication system according to the third modification of the first embodiment of the present invention is configured such that the X2 bearer described above is not set between the radio base station DeNB2 and the relay node RN2, nor alternatively between the relay node RN3 and the relay node RN3.

(Second Embodiment of the Present Invention)

Figure 5:
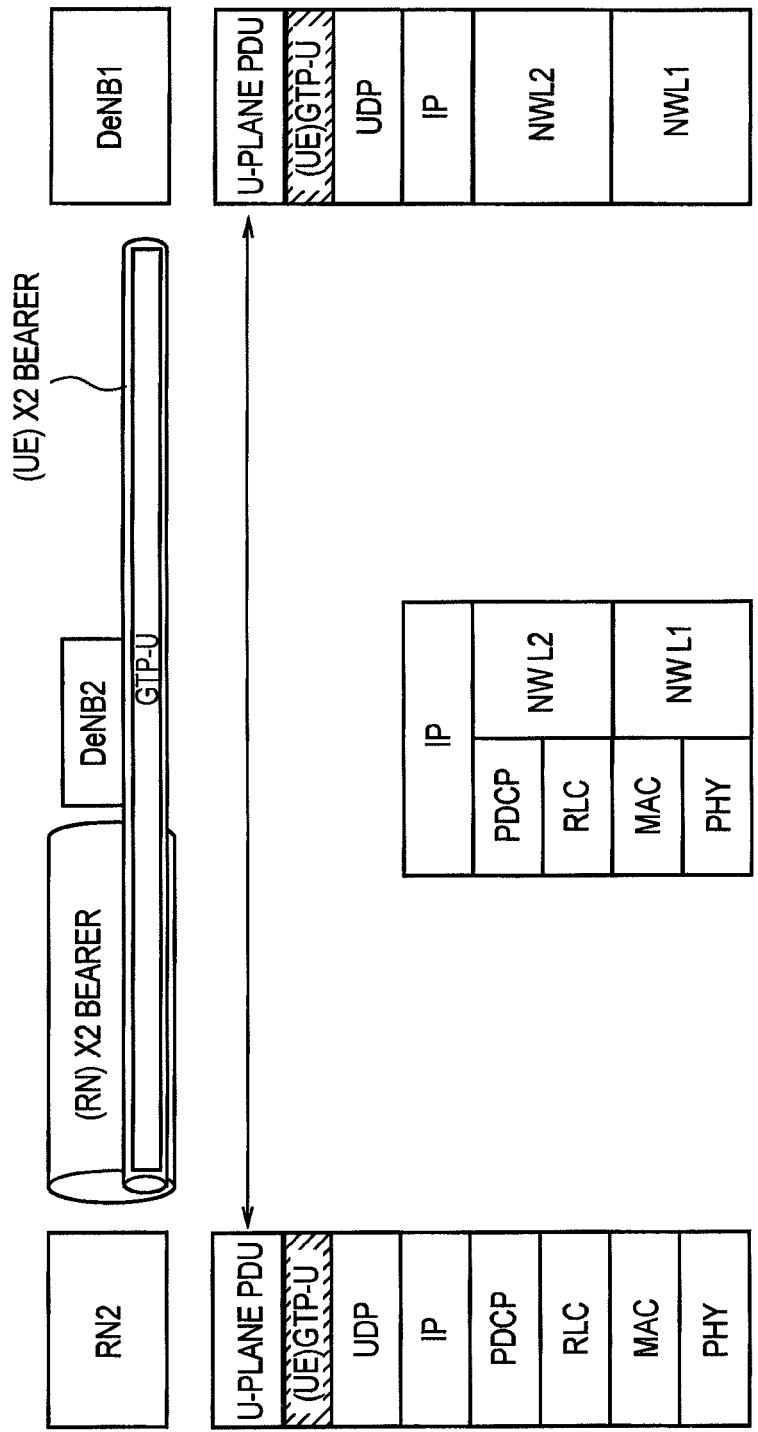
FIG. 5 is a diagram showing the protocol stack of the mobile communication system according to the second embodiment of the present invention.

A description is provided with reference to FIG. 5 for the configuration of the X2 bearer in a second embodiment of the present invention when the handover process of the pattern illustrated by (2) mentioned above is carried out.

For example, as illustrated in FIG. 1, the pattern (2) is configured such that the mobile station UE conducts a handover process between the state in which a radio bearer is set with the relay node RN2 (the first base station) in order to communicate via the relay node RN2 and the radio base station DeNB2 (the first radio base station), and the state in which a radio bearer is set with the radio base station DeNB1 (the second radio base station) in order to communicate via the radio base station DeNB1.

As illustrated in FIG. 5, the handover process of the pattern (2) is configured such that a data signal (U-plane PDU) is transferred via the X2 bearer for the mobile station UE, the "(UE) X2 bearer (radio bearer)", that is multiplexed in the X2 bearer for the relay nodes RN, the "(RN) X2 bearer", between the relay node RN2 and the radio base station DeNB2.

Herein, the X2 bearer for the relay nodes RN, the "(RN) X2 bearer", is set for each QoS, and the X2 bearer for the mobile station UE, the "(UE) X2 bearer", is set between the relay node RN2 and the radio base station DeNB1.

Further, the relay node RN2 includes a physical (PHY) layer function as an X2 bearer function for the relay nodes RN in order to set the X2 bearer for the relay nodes RN, the "(RN) X2 bearer", and an MAC layer function provided as an upper layer function of the physical (PHY) layer function, an RLC layer function provided as an upper layer function of the MAC layer function, and a PDCP layer function provided as an upper layer function of the RLC layer function.

The relay node RN2 further includes an IP layer function provided as an upper layer function of the X2 bearer function for the relay nodes RN, a UDP layer function provided as an upper layer function of the IP layer function, and a (UE) GTP-U layer function provided as an upper layer function of the UDP layer function.

The radio base station DeBN1 further includes a network layer 1 (NW L1) function as a wired bearer function of setting the wired bearer with the radio base station DeNB2, and a network layer 2 (NW L2) function provided as an upper layer function of the network layer 1 (NW L1) function.

The radio base station DeNB1 includes an IP layer function provided as an upper layer function of the wired bearer function, a UDP layer function provided as an upper layer function of the IP layer function, and a (UE) GTP-U layer function provided as an upper layer function of the UDP layer function.

Herein, the (UE) GTP-U layer function of the relay node RN2 and the radio base station DeNB1 is configured to set the X2 bearer for the mobile station UE, the "(UE) X2 bearer", between the relay node RN2 and the radio base station DeNB1.

The radio base station DeNB2 further includes a physical (PHY) layer function as an X2 bearer function for the relay nodes RN in order to set the X2 bearer for the relay nodes RN, the "(RN) X2 bearer", and an MAC layer function provided as an upper layer function of the physical (PHY) layer function, an RLC layer function provided as an upper layer function of the MAC layer function, and a PDCP layer function provided as an upper layer function of the RLC layer function.

The radio base station DeBN2 further includes a network layer 1 (NW L1) function as a wired bearer function of setting the wired bearer with the radio base station DeNB1, and a network layer 2 (NW L2) function provided as an upper layer function of the network layer 1 (NW L1) function.

The radio base station DeNB2 includes an IP layer function as an upper layer function of the X2 bearer function for the relay nodes RN and of the wired bearer function.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, between the radio base station DeNB2 and the relay node RN2, it is not necessary to set a number of X2 bearers for the relay nodes RN, the "(RN) X2 bearers", corresponding to the number of mobile stations UE in communication.

Further, according to the mobile communication system of this embodiment, at the time of the handover process of the mobile station UE, there is no need to set an X2 bearer for the relay nodes RN, the "(RN) X2 bearer", between the radio base station DeNB2 and the relay node RN2, and therefore the handover process can be executed quickly.

(First Modification of the Second Embodiment of the Present Invention)

Figure 6:
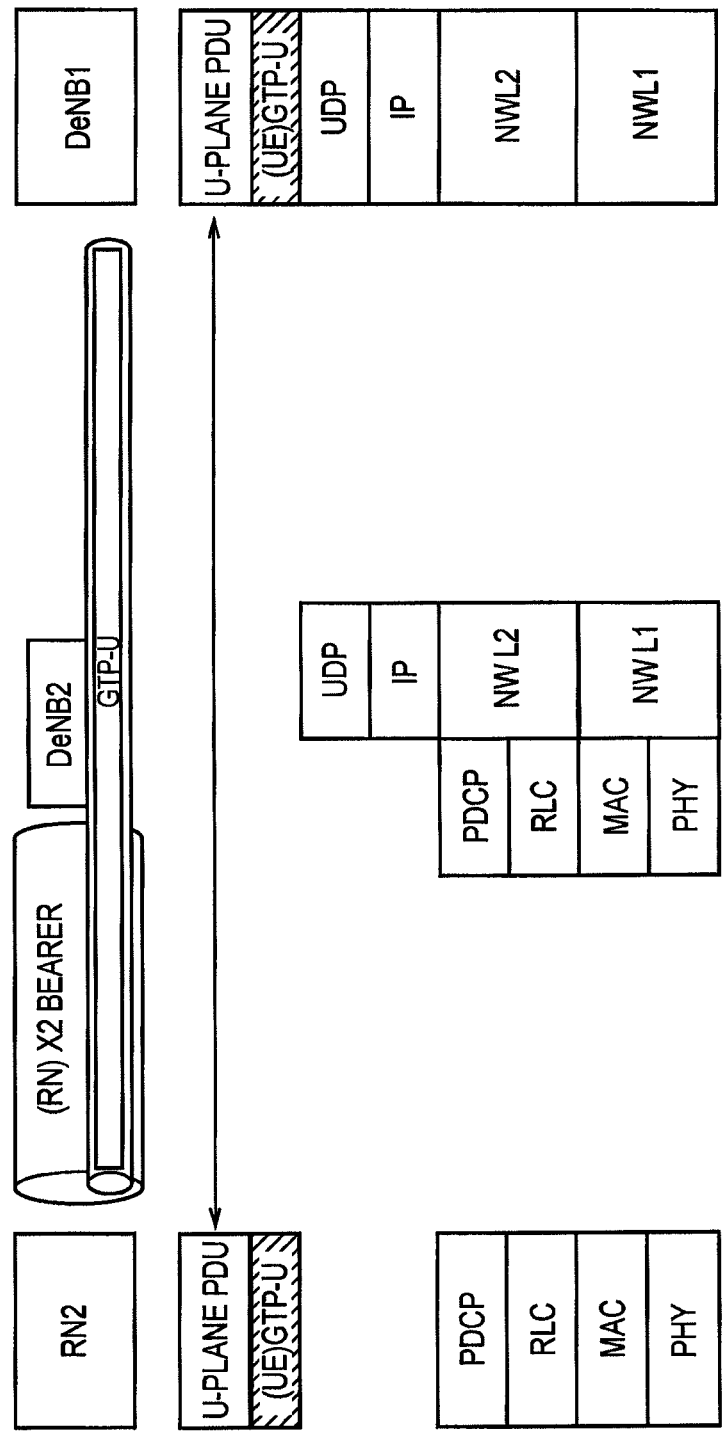
FIG. 6 is a diagram showing the protocol stack of the mobile communication system according to a first modification of the second embodiment of the present invention.

A description will be provided with reference to FIG. 6 for the configuration of the X2 bearer in a first modification of the second embodiment of the present invention when a handover process of the pattern illustrated by (2) mentioned above is performed. Below, this first modification is described by focusing on the points of difference from the second embodiment described above.

In this first modification as well, the X2 bearer for the relay nodes RN, the "(RN) X2 bearer", is set for each QoS.

Also, the relay node RN2 includes a (UE) GTP-U layer function as an upper layer function of the X2 bearer function for the relay nodes RN.

Moreover, the radio base station DeNB2 does not include an IP layer function or the like as upper layer functions of the X2 bearer function for the relay nodes RN.

The radio base station DeNB2 further includes an IP layer function provided as an upper layer function of the wired bearer function, and a UDP layer function provided as an upper layer function of the IP layer function.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, between the radio base station DeNB2 and the relay node RN2, it is not necessary to set a number of X2 bearers for the relay nodes RN, the "(RN) X2 bearers", corresponding to the number of mobile stations UE in communication.

Further, according to the mobile communication system of this embodiment, at the time of the handover process of the mobile station UE, there is no need to set an X2 bearer for the relay nodes RN, the "(RN) X2 bearer", between the radio base station DeNB2 and the relay node RN2, and therefore the handover process can be executed quickly.

(Second Modification of the Second Embodiment of the Present Invention)

Figure 7:
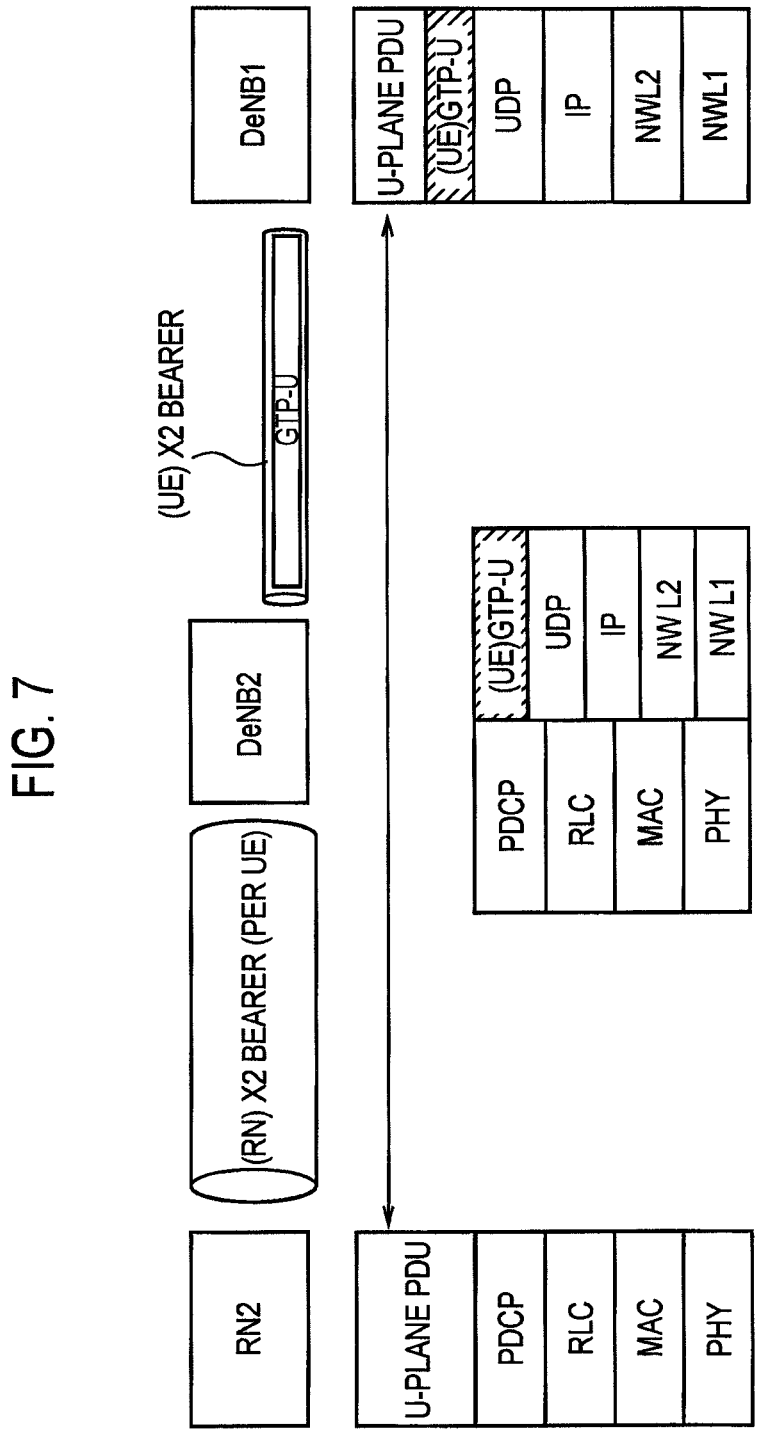
FIG. 7 is a diagram showing the protocol stack of the mobile communication system according to a second modification of the second embodiment of the present invention.

A description will be provided with reference to FIG. 7 for the configuration of the X2 bearer in a second modification of the second embodiment of the present invention when a handover process of the pattern illustrated by (2) mentioned above is performed. Below, this second modification is described by focusing on the points of difference from the second embodiment described above.

In this second modification, an X2 bearer for the relay nodes RN, the "(RN) X2 bearer (per UE)", is set in each mobile station UE and for each QoS.

Further, the relay node RN2 and the radio base station DeNB2 are not provided with a (UE) GTP-U layer function as an upper layer function of the X2 bearer function for the relay nodes RN.

The radio base station DeNB2 further includes an IP layer function provided as an upper layer function of the wired bearer function, a UDP layer function provided as an upper layer function of the IP layer function, and a (UE) GTP-U layer function provided as an upper layer function of the UDP layer function.

The (UE) GTP-U layer function of the radio base station DeNB1 and the radio base station DeNB2 is configured to set the X2 bearer for the mobile station UE, the "(UE) X2 bearer", between the radio base station DeNB1 and the radio base station DeNB2.

The handover process of the patter illustrated by (2) described above is configured such that the data signal (U-plane PDU) is sent over the X2 bearer for the relay nodes RN, the "(RN) X2 bearer (per UE)", and the X2 bearer for the mobile station UE, the "(UE) X2 bearer".

According to the mobile communication system of this embodiment, it is possible to implement a handover process involving the relay nodes RN without performing a major renovation of the protocol stack of each device used in the LTE mobile communication system.

Also, according to the mobile communication system of this embodiment, the overhead assigned to the data signal (U-plane PDU) between the radio base station DeNB2 and the relay node RN2 can be reduced.

Moreover, according to the mobile communication system of this embodiment, at the time of the handover process of the mobile station UE, the priority of each mobile station on the X2 bearer for the relay nodes RN, the "(RN) X2 bearer (per UE)", can be controlled.

(Third Modification of the Second Embodiment of the Present Invention)

In a third modification of the second embodiment of the present invention, the handover process of the pattern illustrated by (2) described above is configured such that the data signal (U-plane PDU) is transferred via an S1 bearer instead of via the X2 bearer described above.

In other words, the mobile communication system according to the third modification of the second embodiment of the present invention is configured such that the X2 bearer described above is not set between the radio base station DeNB1 and the relay node RN2.

(Third Embodiment of the Present Invention)

Figure 8:
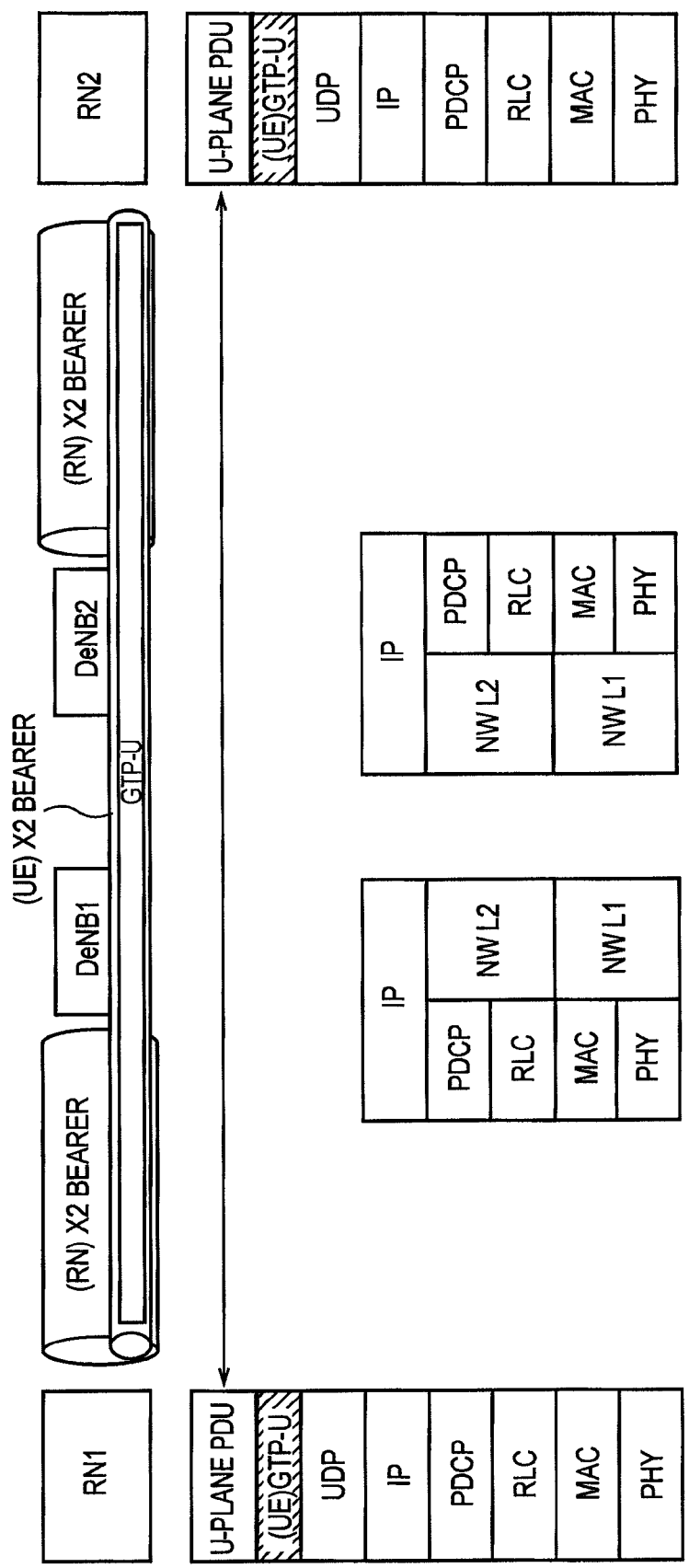
FIG. 8 is a diagram showing the protocol stack of the mobile communication system according to a third embodiment of the present invention.

A description will be provided with reference to FIG. 8 for the configuration of the X2 bearer in a third embodiment of the present invention when a handover process of the pattern illustrated by (3) mentioned above is performed.

For example, as illustrated in FIG. 1, in the pattern (3), the mobile station UE is configured to perform handover processes between the state in which a radio bearer is set with the relay node RN1 (the first relay node) so as to communicate via the relay node RN1 and the radio base station DeNB1 (the first radio base station), and the state in which a radio bearer is set with the relay node RN2 (the second relay node) so as to communicate via the relay node RN2 and the radio base station DeNB2 (the second radio base station).

As illustrated in FIG. 8, the handover process of the pattern (3) is configured such that the data signal (U-plane PDU) is transferred via an X2 bearer for the mobile station UE, the "(UE) X2 bearer (radio bearer)" that is multiplexed in an X2 bearer for the relay nodes RN, the "(RN) X2 bearer", between the relay node RN2 and the radio base station DeNB2 and in an X2 bearer for the relay nodes RN, the "(RN) X2 bearer", between the relay node RN1 and the radio base station DeNB1.

Herein, the X2 bearer for the relay nodes RN, the "(RN) X2 bearer", between the relay node RN1 and the radio base station DeNB1, and the X2 bearer for the relay nodes RN, the "(RN) X2 bearer", between the relay node RN2 and the radio base station DeNB2 are set for each QoS, and the X2 bearer for the mobile station UE, the "(UE) X2 bearer", is set between the relay node RN1 and the relay node RN2.

Further, the relay node RN1 and the relay node RN2 include a physical (PHY) layer function as an X2 bearer function for the relay nodes RN in order to set the X2 bearer for the relay nodes RN, the "(RN) X2 bearer", and an MAC layer function provided as an upper layer function of the physical (PHY) layer function, an RLC layer function provided as an upper layer function of the MAC layer function, and a PDCP layer function provided as an upper layer function of the RLC layer function.

Furthermore, the relay node RN1 and the relay node RN2 include an IP layer function provided as an upper layer function of the X2 bearer function for the relay nodes RN, a UDP layer function provided as an upper layer function of the IP layer function, and a (UE) GTP-U layer function provided as an upper layer function of the UDP layer function.

Further, the radio base station DeNB1 and the radio base station DeNB2 include a physical (PHY) layer function as an X2 bearer function for the relay nodes RN in order to set the X2 bearer for the relay nodes RN, the "(RN) X2 bearer", and an MAC layer function provided as an upper layer function of the physical (PHY) layer function, an RLC layer function provided as an upper layer function of the MAC layer function, and a PDCP layer function provided as an upper layer function of the RLC layer function.

The radio base station DeBN1 and the radio base station DeNB2 are further provided with a network layer 1 (NW L1) function as a wired bearer function of setting the wired bearer, and a network layer 2 (NW L2) function provided as an upper layer function of the network layer 1 (NW L1) function.

The radio base station DeNB1 and the radio base station DeNB2 include an IP layer function as an upper layer function of the wired bearer function.

Herein, the (UE) GTP-U layer function of the relay node RN1 and the relay node RN2 is configured to set the X2 bearer for the mobile station UE, the "(UE) X2 bearer", between the relay node RN1 and the relay node RN2.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, between the radio base station DeNB1 and the relay node RN1, nor between the radio base station DeNB2 and the relay node RN2, there is no need to set a number of X2 bearers for the relay nodes RN, the "(RN) X2 bearers", corresponding to the number of mobile stations UE in communication.

Moreover, according to the mobile communication system of this embodiment, at the time of the handover process of the mobile station UE, there is no need to set the X2 bearer for the relay nodes RN, the "(RN) X2 bearer", between the radio base station DeNB1 and the relay node RN1, nor between the radio base station DeNB2 and the relay node RN2, and therefore the handover process can be executed quickly.

(First Modification of the Third Embodiment of the Present Invention)

Figure 9:
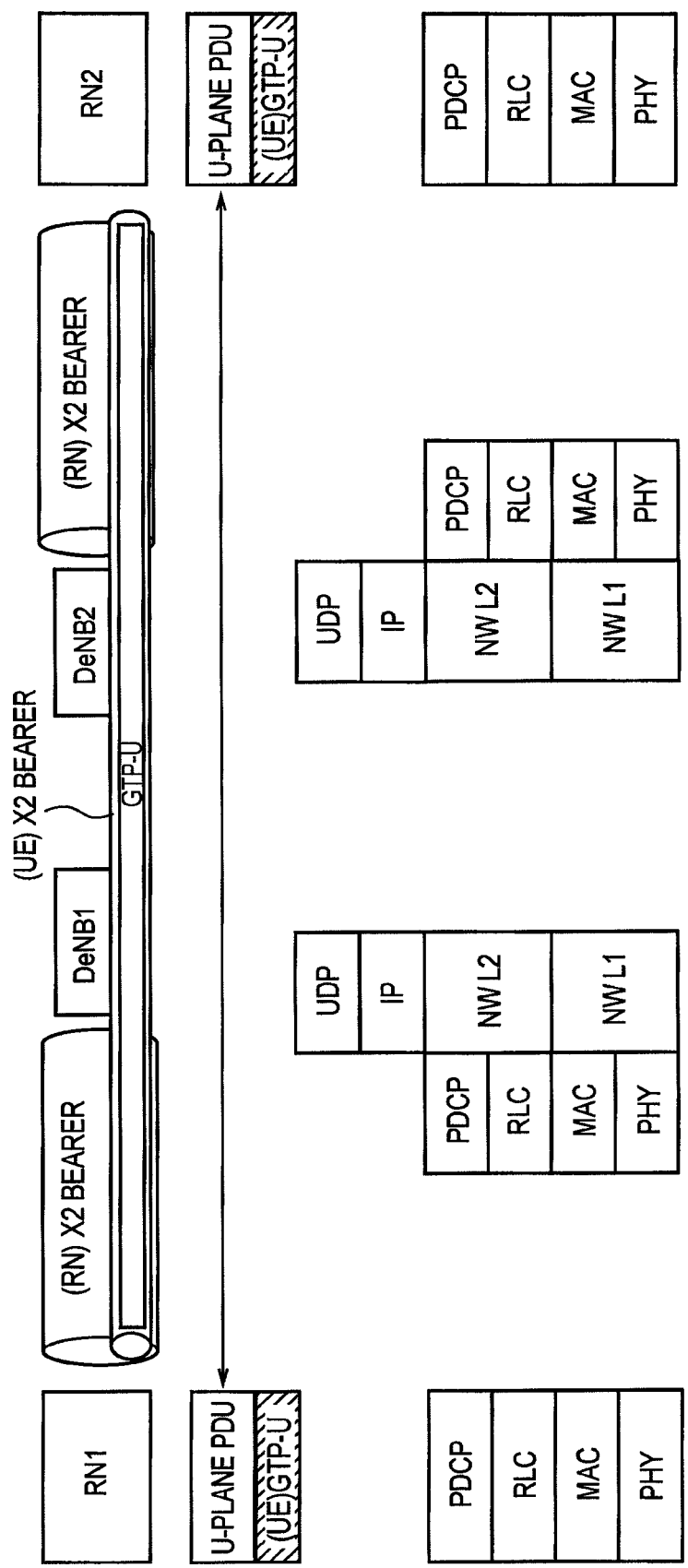
FIG. 9 is a diagram showing the protocol stack of the mobile communication system according to a first modification of the third embodiment of the present invention.

A description will be provided with reference to FIG. 9 for the configuration of the X2 bearer in a first modification of the third embodiment of the present invention when a handover process of the pattern illustrated by (3) described above is performed. Below, this first modification is described by focusing on the points of difference from the third embodiment described above.

In this first modification as well, the X2 bearer for the relay nodes RN, the "(RN) X2 bearer", between the radio base station DeNB1 and the relay node RN1, and the X2 bearer for the relay nodes RN, the "(RN) X2 bearer", between the radio base station DeNB2 and the relay node RN2 are set for each QoS.

Further, the relay node RN1 and the relay node RN2 include a (UE) GTP-U layer function as an upper layer function of the X2 bearer function for the relay nodes RN.

Moreover, the radio base station DeNB1 and the radio base station DeNB2 are not provided with an IP layer function and the like as an upper layer functions of the X2 bearer function for the relay nodes RN.

The radio base station DeNB1 and the radio base station DeNB2 are further provided with an IP layer function provided as an upper layer function of the wired bearer function, and a UDP layer function provided as an upper layer function of the IP layer function.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, between the radio base station DeNB1 and the relay node RN1, nor between the radio base station DeNB2 and the relay node RN2, there is no need to set a number of X2 bearers for the relay nodes RN, the "(RN) X2 bearers", corresponding to the number of mobile stations UE in communication.

Moreover, according to the mobile communication system of this embodiment, at the time of the handover process of the mobile station UE, there is no need to set the X2 bearer for the relay nodes RN, the "(RN) X2 bearer", between the radio base station DeNB1 and the relay node RN1, nor between the radio base station DeNB2 and the relay node RN2, and therefore the handover process can be executed quickly.

(Second Modification of the Third Embodiment of the Present Invention)

Figure 10:
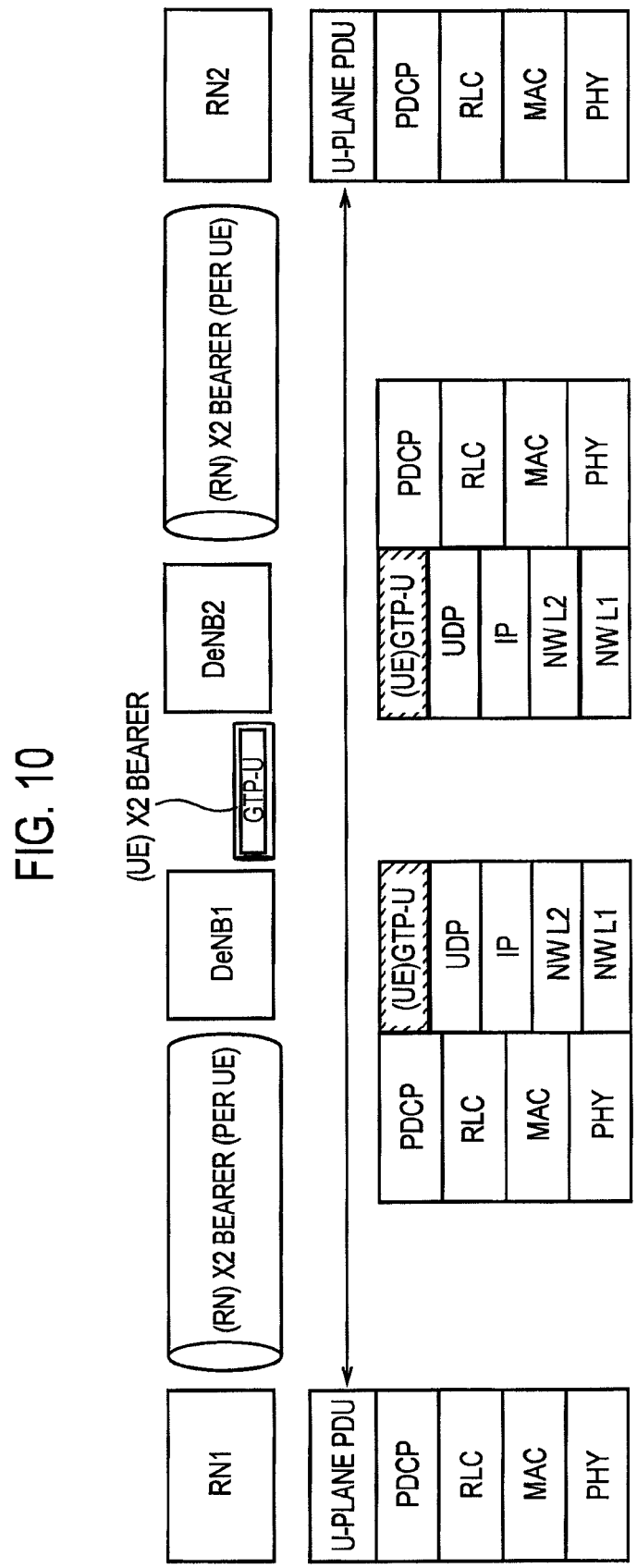
FIG. 10 is a diagram showing the protocol stack of the mobile communication system according to a second modification of the third embodiment of the present invention.

A description will be provided with reference to FIG. 10 for the configuration of the X2 bearer in a second modification of the third embodiment of the present invention when a handover process of the pattern illustrated by (3) described above is performed. Below, this second modification is described by focusing on the points of difference from the third embodiment described above.

In this second modification, the X2 bearer for the relay nodes RN, the "(RN) X2 bearer (per UE)" between the radio base station DeNB1 and the relay node RN1, and the X2 bearer for the relay nodes RN, the "(RN) X2 bearer (per UE)", between the radio base station DeNB2 and the relay node RN2 are set in each mobile station UE and for each QoS.

Further, the relay node RN1 and the relay node RN2 are not provided with a (UE) GTP-U layer function as an upper layer function of the X2 bearer function for the relay nodes RN.

The radio base station DeNB1 and the radio base station DeNB2 are further provided with an IP layer function provided as an upper layer function of the wired bearer function, a UDP layer function provided as an upper layer function of the IP layer function, and a (UE) GTP-U layer function provided as an upper layer function of the UDP layer function.

The (UE) GTP-U layer function of the radio base station DeNB1 and the radio base station DeNB2 is configured to set the X2 bearer for the mobile station UE, the "(UE) X2 bearer", between the radio base station DeNB1 and the radio base station DeNB2.

The handover process of the pattern illustrated by (3) described above is configured such that the data signal (U-plane PDU) is sent via the X2 bearer for the relay nodes RN, the "(RN) X2 bearer (per UE)", between the radio base station DeNB1 and the relay node RN1, via the X2 bearer for the mobile station UE, the "(UE) X2 bearer", and via the X2 bearer for the relay nodes RN, the "(RN) X2 bearer (per UE)", between the radio base station DeNB2 and the relay node RN2.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, the overhead assigned to the data signal (U-plane PDU) between the radio base station DeNB1 and the relay node RN1, and between the radio base station DeNB2 and the relay node RN2, can be reduced.

Moreover, according to the mobile communication system of this embodiment, at the time of the handover process of the mobile station UE, the priority of each mobile station on the X2 bearer for the relay nodes RN, the "(RN) X2 bearer (per UE)", between the radio base station DeNB1 and the relay node RN1 and on the X2 bearer for the relay nodes RN, the "(RN) X2 bearer (per UE), between the radio base station DeNB2 and the relay node RN2 can be controlled.

(Third Modification of the Third Embodiment of the Present Invention)

In a third modification of the third embodiment of the present invention, the handover process of the pattern illustrated by (3) described above is configured such that the data signal (U-plane PDU) is transferred via an S1 bearer instead of via the X2 bearer described above.

In other words, the mobile communication system according to the third modification of the third embodiment of the present invention is configured such that the X2 bearer described above is not set between the relay node RN1 and the relay node RN2.

(Fourth Embodiment of the Present Invention)

Figure 11:
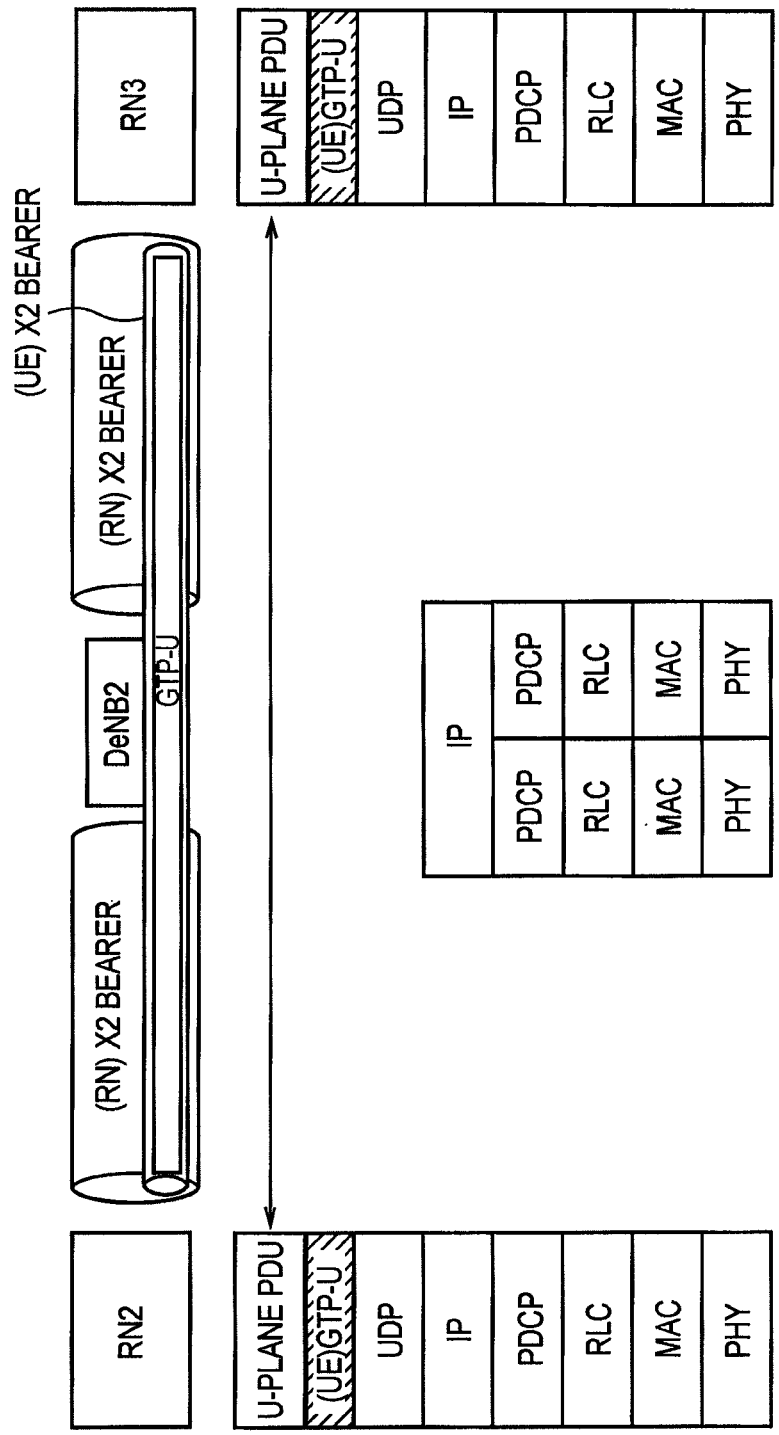
FIG. 11 is a diagram showing the protocol stack of the mobile communication system according to a fourth embodiment of the present invention.

A description will be provided with reference to FIG. 11 for the configuration of the X2 bearer in a fourth embodiment of the present invention when a handover process of the pattern illustrated by (4) mentioned above is performed.

For example, as illustrated in FIG. 1, in the pattern (4), the mobile station UE is configured to perform handover processes between the state in which a radio bearer is set with the relay node RN2 (the first relay node) so as to communicate via the relay node RN2 and the radio base station DeNB2, and the state in which a radio bearer is set with the relay node RN3 (the second relay node) so as to communicate via the relay node RN3 and the radio base station DeNB2.

As illustrated in FIG. 11, the handover process of the pattern (4) is configured such that the data signal (U-plane PDU) is transferred via an X2 bearer for the mobile station UE, the "(UE) X2 bearer (radio bearer)", that is multiplexed in an X2 bearer for the relay nodes RN, the "(RN) X2 bearer", between the relay node RN2 and the radio base station DeNB2, and in an X2 bearer for the relay nodes RN, the "(RN) X2 bearer", between the relay node RN3 and the radio base station DeNB2.

Herein, the X2 bearer for the relay nodes RN, the "(RN) X2 bearer", between the relay node RN2 and the radio base station DeNB2, and the X2 bearer for the relay nodes RN, the "(RN) X2 bearer", between the relay node RN3 and the radio base station DeNB2 are set for each QoS, and the X2 bearer for the mobile station UE, the "(UE) X2 bearer", is set between the relay node RN2 and the relay node RN3.

Further, the relay node RN2 and the relay node RN3 include a physical (PHY) layer function as an X2 bearer function for the relay nodes RN in order to set the X2 bearer for the relay nodes RN, the "(RN) X2 bearer", and an MAC layer function provided as an upper layer function of the physical (PHY) layer function, an RLC layer function provided as an upper layer function of the MAC layer function, and a PDCP layer function provided as an upper layer function of the RLC layer function.

Furthermore, the relay node RN2 and the relay node RN3 include an IP layer function provided as an upper layer function of the X2 bearer function for the relay nodes RN, a UDP layer function provided as an upper layer function of the IP layer function, and a (UE) GTP-U layer function provided as an upper layer function of the UDP layer function.

Further, the radio base station DeNB2 includes a physical (PHY) layer function as an X2 bearer function for the relay nodes RN in order to set the X2 bearer for the relay nodes RN, the "(RN) X2 bearer" between the relay nodes RN2 and the relay nodes RN3, and an MAC layer function provided as an upper layer function of the physical (PHY) layer function, an RLC layer function provided as an upper layer function of the MAC layer function, and a PDCP layer function provided as an upper layer function of the RLC layer function.

The radio base station DeNB2 includes an IP layer function as an upper layer function of the X2 bearer function for the relay nodes RN.

Herein, the (UE) GTP-U layer function of the relay node RN2 and the relay node RN3 is configured to set the X2 bearer for the mobile station UE, the "(UE) X2 bearer", between the relay node RN2 and the relay node RN3.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, between the radio base station DeNB2 and the relay node RN2, nor between the radio base station DeNB2 and the relay node RN3, there is no need to set a number of X2 bearers for the relay nodes RN, the "(RN) X2 bearers", corresponding to the number of mobile stations UE in communication.

Moreover, according to the mobile communication system of this embodiment, at the time of the handover process of the mobile station UE, there is no need to set the X2 bearer for the relay nodes RN, the "(RN) X2 bearer", between the radio base station DeNB2 and the relay node RN2, nor between the radio base station DeNB2 and the relay node RN3, and therefore the handover process can be executed quickly.

(First Modification of the Fourth Embodiment of the Present Invention)

Figure 12:
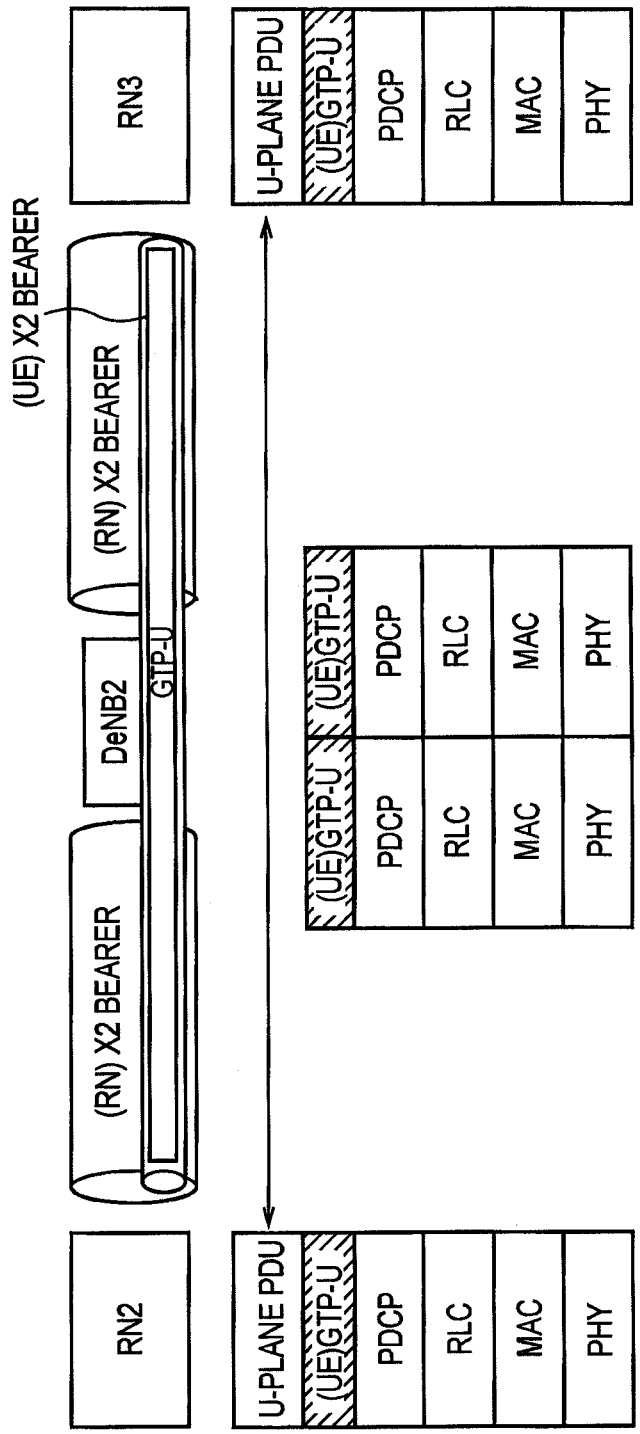
FIG. 12 is a diagram showing the protocol stack of the mobile communication system according to a first modification of the fourth embodiment of the present invention.

A description will be provided with reference to FIG. 12 for the configuration of the X2 bearer in a first modification of the fourth embodiment of the present invention when a handover process of the pattern illustrated by (4) mentioned above is performed. Below, this first modification is described by focusing on the points of difference from the fourth embodiment described above.

In this first modification as well, the X2 bearer for the relay nodes RN, the "(RN) X2 bearer", between the relay node RN2 and the radio base station DeNB2, and the X2 bearer for the relay nodes RN, the "(RN) X2 bearer", between the relay node RN3 and the radio base station DeNB2 are set for each QoS.

Further, the relay node RN2 and the relay node RN3 include a (UE) GTP-U layer function as an upper layer function of the X2 bearer function for the relay nodes RN.

Moreover, the radio base station DeNB2 includes a GTP-U layer function as an upper layer function of the X2 bearer function for the relay nodes RN.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, between the radio base station DeNB2 and the relay node RN2, nor between the radio base station DeNB2 and the relay node RN3, there is no need to set a number of X2 bearers for the relay nodes RN, the "(RN) X2 bearers", corresponding to the number of mobile stations UE in communication.

Moreover, according to the mobile communication system of this embodiment, at the time of the handover process of the mobile station UE, there is no need to set the X2 bearer for the relay nodes RN, the "(RN) X2 bearer", between the radio base station DeNB2 and the relay node RN2, nor between the radio base station DeNB2 and the relay node RN3, and therefore the handover process can be executed quickly.

(Second Modification of the Fourth Embodiment of the Present Invention)

Figure 13:
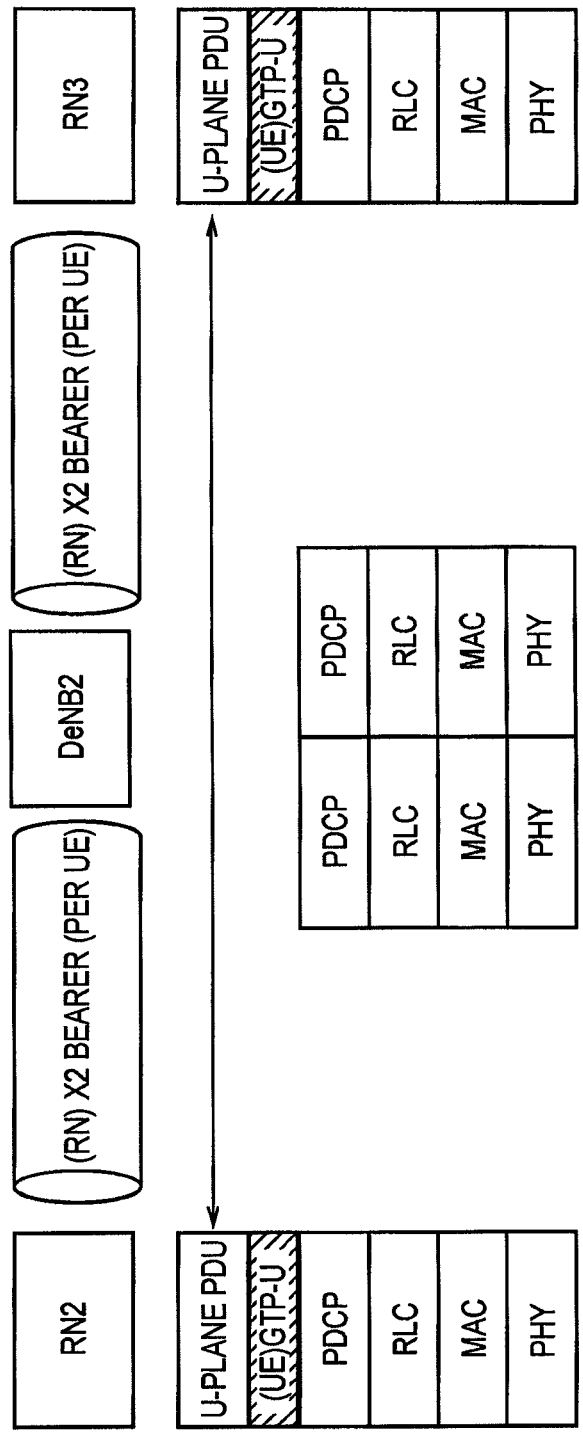
FIG. 13 is a diagram showing the protocol stack of the mobile communication system according to a second modification of the fourth embodiment of the present invention.

A description will be provided with reference to FIG. 13 for the configuration of the X2 bearer in a second modification of the fourth embodiment of the present invention when a handover process of the pattern illustrated by (4) mentioned above is performed. Below, this second modification is described by focusing on the points of difference from the fourth embodiment described above.

In this second modification, the X2 bearer for the relay nodes RN, the "(RN) X2 bearer (per UE)" between the relay node RN2 and the radio base station DeNB2, and the X2 bearer for the relay nodes RN, the "(RN) X2 bearer (per UE)", between the relay node RN3 and the radio base station DeNB2 are set in each mobile station UE and for each QoS.

Further, the relay node RN2 and the relay node RN3 are not provided with a (UE) GTP-U layer function as an upper layer function of the X2 bearer function for the relay nodes RN.

Further, the radio base station DeNB2 does not include a (UE) GTP-U layer function as an upper layer function of the X2 bearer function for the relay nodes RN.

The handover process of the pattern illustrated by (4) described above is configured such that the data signal (U-plane PDU) is sent via an X2 bearer for the relay nodes RN, the "(RN) X2 bearer (per UE)", between the relay node RN2 and the radio base station DeNB2, and via an X2 bearer for the relay nodes RN, the "(RN) X2 bearer (per UE)", between the relay node RN3 and the radio base station DeNB2.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, the overhead assigned to the data signal (U-plane PDU) between the radio base station DeNB2 and the relay node RN2, and between the radio base station DeNB2 and the relay node RN3, can be reduced.

Moreover, according to the mobile communication system of this embodiment, at the time of the handover process of the mobile station UE, the priority of each mobile station on the X2 bearer for the relay nodes RN, the "(RN) X2 bearer (per UE)", can be controlled.

(Third Modification of the Fourth Embodiment of the Present Invention)

In a third modification of the fourth embodiment of the present invention, the handover process of the pattern illustrated by (4) described above is configured such that the data signal (U-plane PDU) is transferred via an S1 bearer instead of via the X2 bearer described above.

In other words, the mobile communication system according to the third modification of the fourth embodiment of the present invention is configured such that the X2 bearer described above is not set between the radio base station DeNB2 and the relay node RN2, nor between the radio base station DeNB2 and the relay node RN3.

(Fifth Embodiment of the Present Invention)

Figure 14:
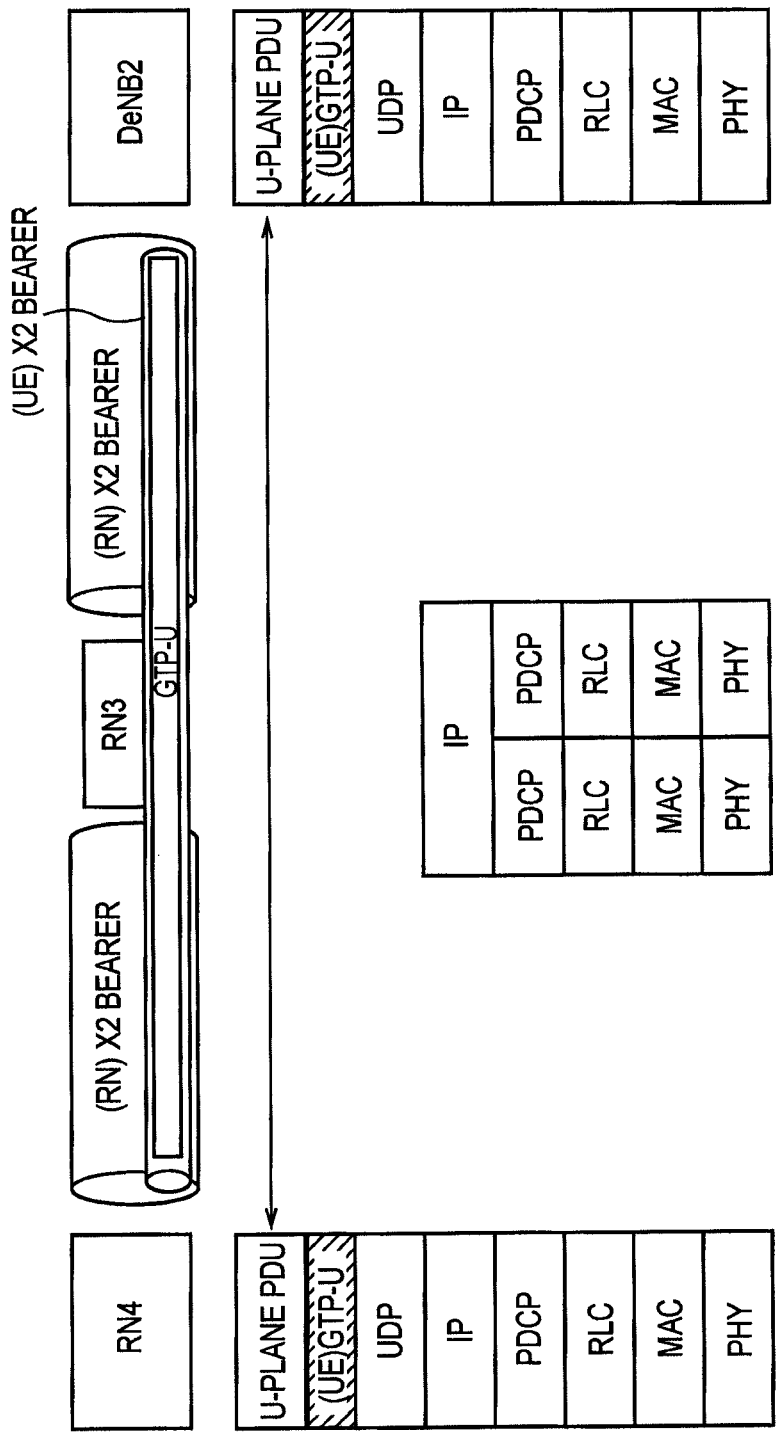
FIG. 14 is a diagram showing the protocol stack of the mobile communication system according to a fifth embodiment of the present invention.

A description will be provided with reference to FIG. 14 for the configuration of the X2 bearer in a fifth embodiment of the present invention when a handover process of the pattern illustrated by (6) mentioned above is performed.

For example, as illustrated in FIG. 1, in the pattern (6), the mobile station UE is configured to perform handover processes between the state in which a radio bearer is set with the relay node RN4 (the first relay node) so as to communicate via the relay node RN4, the relay node RN3 (the second relay node), and the radio base station DeNB2, and the state in which a radio bearer is set with the radio base station DeNB2 so as to communicate via the radio base station DeNB.

As illustrated in FIG. 14, the handover process of the pattern 6) is configured such that the data signal (U-plane PDU) is transferred via an X2 bearer for the mobile station UE, the "(UE) X2 bearer (radio bearer)", that is multiplexed in an X2 bearer for the relay nodes RN, the "(RN) X2 bearer", between the relay node RN4 and the relay node RN3, and in an X2 bearer for the relay nodes RN, the "(RN) X2 bearer", between the relay node RN3 and the radio base station DeNB2.

Herein, the X2 bearer for the relay nodes RN, the "(RN) X2 bearer", between the relay node RN4 and the relay node RN3, and the X2 bearer for the relay nodes RN, the "(RN) X2 bearer", between the relay node RN3 and the radio base station DeNB2 are set for each QoS, and the X2 bearer for the mobile station UE, the "(UE) X2 bearer", is set between the relay node RN4 and the radio base station DeNB2.

Further, the relay node RN4 and the radio base station DeNB2 include a physical (PHY) layer function as an X2 bearer function for the relay nodes RN in order to set the X2 bearer for the relay nodes RN, the "(RN) X2 bearer", and an MAC layer function provided as an upper layer function of the physical (PHY) layer function, an RLC layer function provided as an upper layer function of the MAC layer function, and a PDCP layer function provided as an upper layer function of the RLC layer function.

Furthermore, the relay node RN4 and the radio base station DeNB2 include an IP layer function provided as an upper layer function of the X2 bearer function for the relay nodes RN, a UDP layer function provided as an upper layer function of the IP layer function, and a (UE) GTP-U layer function provided as an upper layer function of the UDP layer function.

Further, the relay node RN3 includes a physical (PHY) layer function as an X2 bearer function for the relay nodes RN in order to set the X2 bearer for the relay nodes RN, the "(RN) X2 bearer" between the relay nodes RN4 and the radio base station DeNB2, and an MAC layer function provided as an upper layer function of the physical (PHY) layer function, an RLC layer function provided as an upper layer function of the MAC layer function, and a PDCP layer function provided as an upper layer function of the RLC layer function.

The relay node RN3 includes an IP layer function as an upper layer function of the X2 bearer function for the relay nodes RN.

Herein, the (UE) GTP-U layer function of the relay node RN4 and the radio base station DeNB2 is configured to set the X2 bearer for the mobile station UE, the "(UE) X2 bearer", between the relay node RN4 and the radio base station DeNB2.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, between the relay node RN4 and the relay node RN3, nor between the radio base station DeNB2 and the relay node RN3, there is no need to set a number of X2 bearers for the relay nodes RN, the "(RN) X2 bearers", corresponding to the number of mobile stations UE in communication.

Moreover, according to the mobile communication system of this embodiment, at the time of the handover process of the mobile station UE, there is no need to set the X2 bearer for the relay nodes RN, the "(RN) X2 bearer", between the relay node RN4 and the relay node RN3, nor between the radio base station DeNB2 and the relay node RN3, and therefore the handover process can be executed quickly.

(First Modification of the Fifth Embodiment of the Present Invention)

Figure 15:
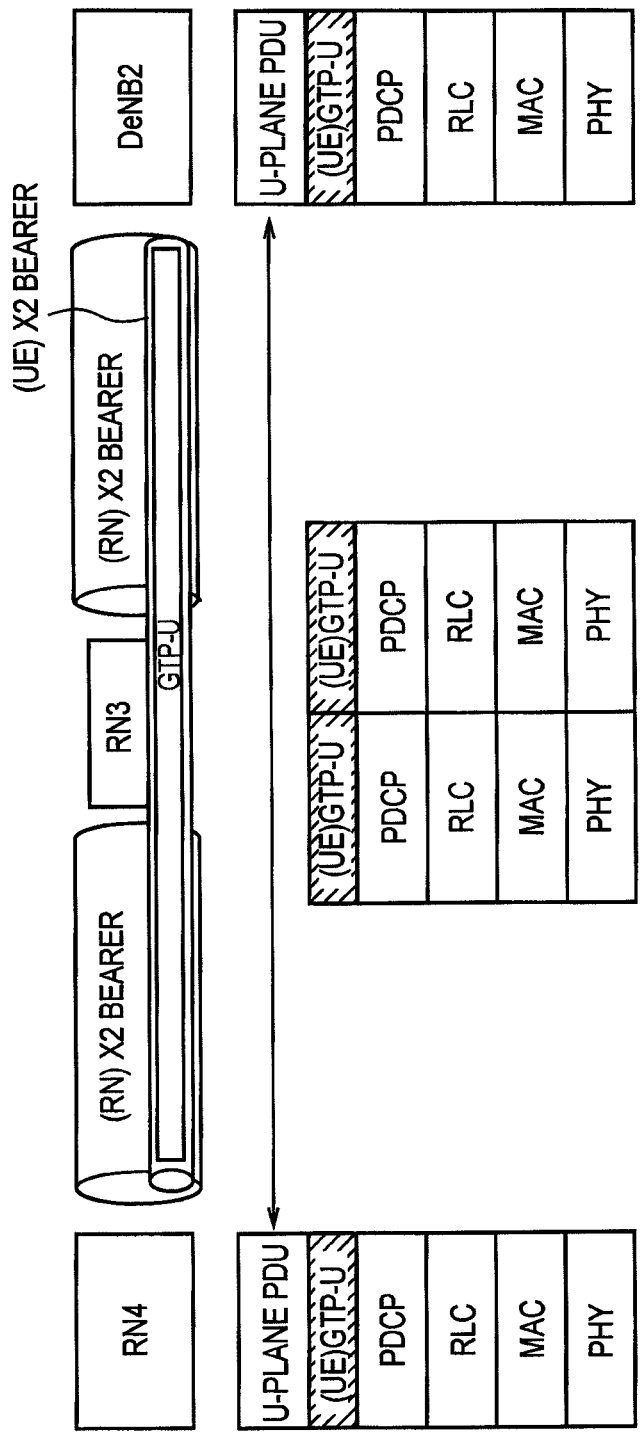
FIG. 15 is a diagram showing the protocol stack of the mobile communication system according to the first modification of the fifth embodiment of the present invention.

A description will be provided with reference to FIG. 15 for the configuration of the X2 bearer in a first modification of the fifth embodiment of the present invention when a handover process of the pattern illustrated by (6) mentioned above is performed. Below, this first modification is described by focusing on the points of difference from the fifth embodiment described above.

In this first modification as well, the X2 bearer for the relay nodes RN, the "(RN) X2 bearer", between the relay node RN4 and the relay node RN3, and the X2 bearer for the relay nodes RN, the "(RN) X2 bearer", between the relay node RN3 and the radio base station DeNB2 are set for each QoS.

The relay node RN4 and the radio base station DeNB2 include a (UE) GTP-U layer function as an upper layer function of the X2 bearer function for the relay nodes RN.

Also, the relay node RN3 includes a GTP-U layer function as an upper layer function of the X2 bearer function for the relay nodes RN.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, between the relay node RN4 and the relay node RN3, nor between the radio base station DeNB2 and the relay node RN3, there is no need to set a number of X2 bearers for the relay nodes RN, the "(RN) X2 bearers", corresponding to the number of mobile stations UE in communication.

Moreover, according to the mobile communication system of this embodiment, at the time of the handover process of the mobile station UE, there is no need to set the X2 bearer for the relay nodes RN, the "(RN) X2 bearer", between the relay node RN4 and the relay node RN3, nor between the radio base station DeNB2 and the relay node RN3, and therefore the handover process can be executed quickly.

(Second Modification of the Fifth Embodiment of the Present Invention)

Figure 16:
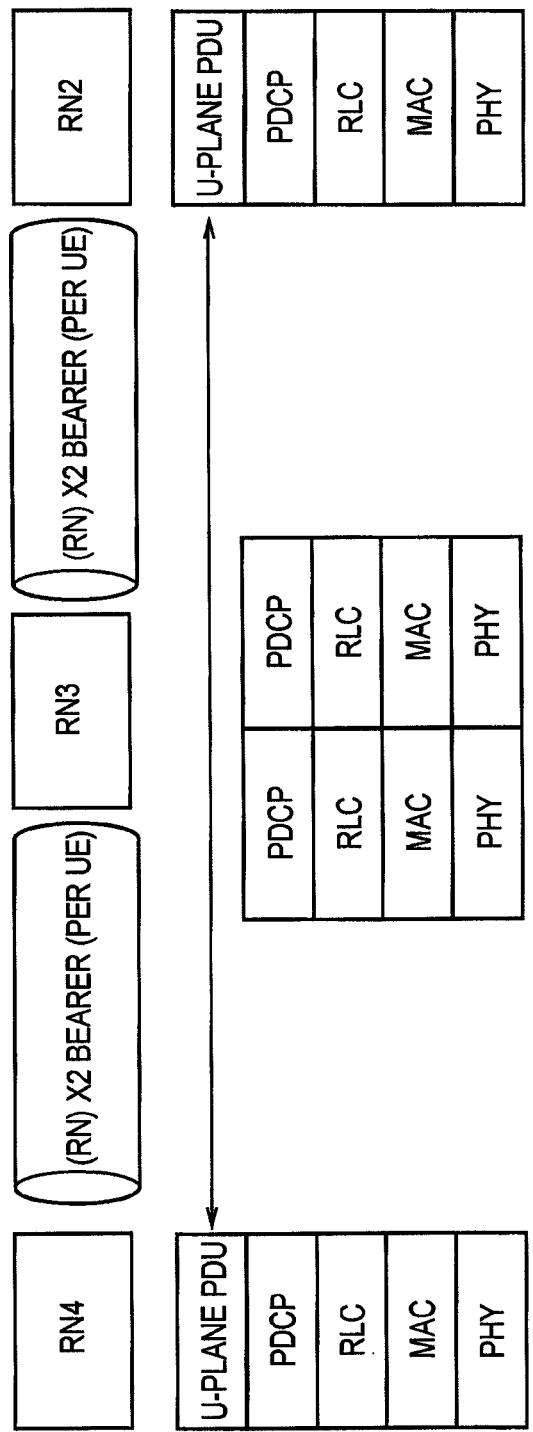
FIG. 16 is a diagram showing the protocol stack of the mobile communication system according to a second modification of the fifth embodiment of the present invention.

A description will be provided with reference to FIG. 16 for the configuration of the X2 bearer in a second modification of the fifth embodiment of the present invention when a handover process of the pattern illustrated by (6) mentioned above is performed. Below, this second modification is described by focusing on the points of difference from the fifth embodiment described above.

In this second modification, the X2 bearer for the relay nodes RN, the "(RN) X2 bearer (per UE)" between the relay node RN4 and the relay node RN3, and the X2 bearer for the relay nodes RN, the "(RN) X2 bearer (per UE)", between the relay node RN3 and the radio base station DeNB2 are set in each mobile station UE and for each QoS.

Further, the relay node RN4 and the radio base station DeNB2 are not provided with a (UE) GTP-U layer function as an upper layer function of the X2 bearer function for the relay nodes RN.

Further, the relay node RN3 does not include a (UE) GTP-U layer function as an upper layer function of the X2 bearer function for the relay nodes RN.

The handover process of the pattern illustrated by (6) described above is configured such that the data signal (U-plane PDU) is sent via an X2 bearer for the relay nodes RN, the "(RN) X2 bearer (per UE)", between the relay node RN4 and the relay node RN3, and via an X2 bearer for the relay nodes RN, the "(RN) X2 bearer (per UE)", between the relay node RN3 and the radio base station DeNB2.

According to the mobile communication system of this embodiment, it is possible to implement a handover process involving the relay nodes RN without performing a major renovation of the protocol stack of each device used in the LTE mobile communication system.

Also, according to the mobile communication system of this embodiment, the overhead assigned to the data signal (U-plane PDU) between the relay node RN4 and the relay node RN3, and between the radio base station DeNB2 and the relay node RN3, can be reduced.

Moreover, according to the mobile communication system of this embodiment, at the time of the handover process of the mobile station UE, the priority of each mobile station on the X2 bearer for the relay nodes RN, the "(RN) X2 bearer (per UE)", can be controlled.

(Third Modification of the Fifth Embodiment of the Present Invention)

In a third modification of the fifth embodiment of the present invention, the handover process of the pattern illustrated by (6) mentioned above is configured such that the data signal (U-plane PDU) is transferred via an S1 bearer instead of via the X2 bearer described above.

In other words, the mobile communication system according to the third modification of the fifth embodiment of the present invention is configured such that the X2 bearer described above is not set between the relay node RN4 and the relay node RN3, nor between the radio base station DeNB2 and the relay node RN3.

(Sixth Embodiment of the Present Invention)

Figure 17:
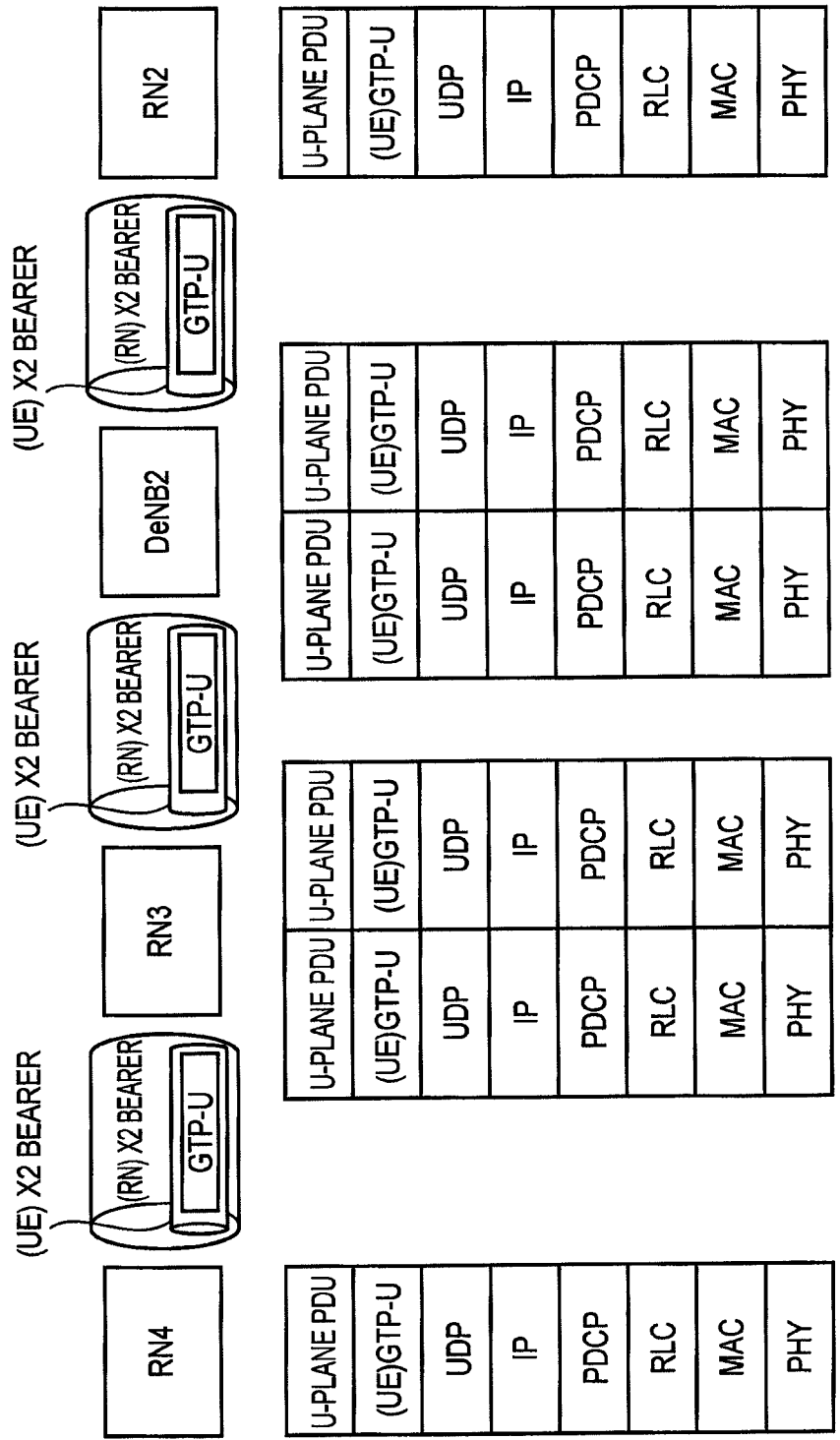
FIG. 17 is a diagram showing the protocol stack of the mobile communication system according to a sixth embodiment of the present invention.
Figure 18:
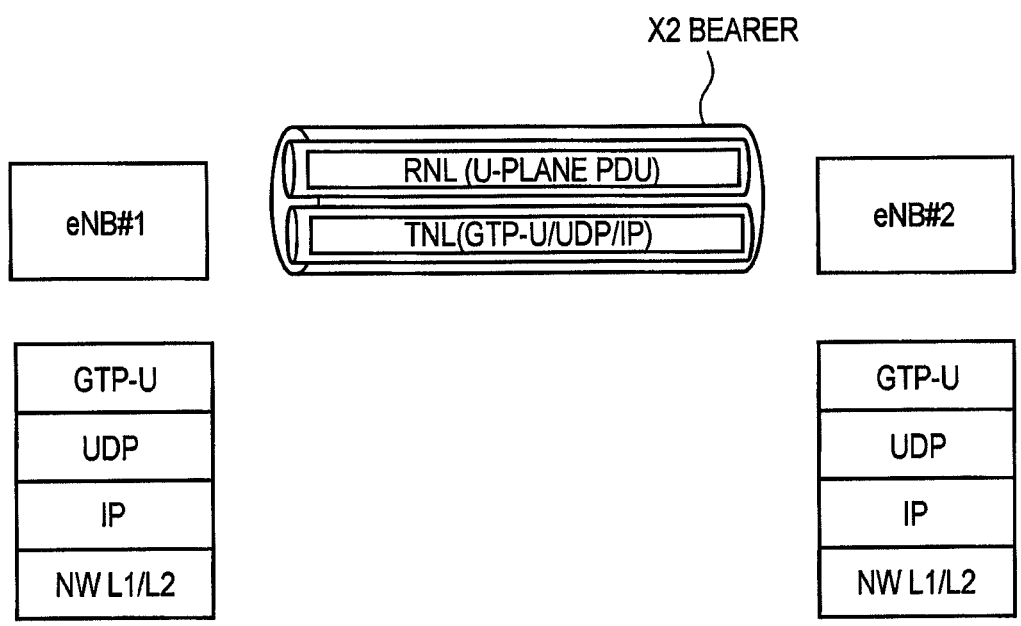
FIG. 18 is a diagram showing the protocol stack of a conventional mobile communication system.

A description will be provided with reference to FIG. 17 for the configuration of the X2 bearer in a sixth embodiment of the present invention when a handover process other than the patterns illustrated by (1) to (6) mentioned above is performed.

For example, in FIG. 1, the pattern is configured such that the mobile station UE performs handover process between a state in which a radio bearer is set with the relay node RN4 in order to communicate via the relay node RN4, the relay node RN3, and the radio base station DeNB2, and a state in which a radio bearer is set with the relay node RN2 in order to communicate via the relay node RN2 and the radio base station DeNB.

Further, the relay node RN4 includes a physical (PHY) layer function as an X2 bearer function for the relay nodes RN in order to set the X2 bearer for the relay nodes RN, the "(RN) X2 bearer", and an MAC layer function provided as an upper layer function of the physical (PHY) layer function, an RLC layer function provided as an upper layer function of the MAC layer function, and a PDCP layer function provided as an upper layer function of the RLC layer function.

The relay node RN4 further includes an IP layer function provided as an upper layer function of the X2 bearer function for the relay nodes RN, a UDP layer function provided as an upper layer function of the IP layer function, and a (UE) GTP-U layer function provided as an upper layer function of the UDP layer function.

In the same manner, the relay node RN3 includes a physical (PHY) layer function as an X2 bearer function for the relay nodes RN in order to set the X2 bearer for the relay nodes RN, the "(RN) X2 bearer", between the relay node RN4 and the radio base station DeNB2, and an MAC layer function provided as an upper layer function of the physical (PHY) layer function, an RLC layer function provided as an upper layer function of the MAC layer function, and a PDCP layer function provided as an upper layer function of the RLC layer function.

The relay node RN3 further includes an IP layer function provided as an upper layer function of the X2 bearer function for the relay nodes RN, a UDP layer function provided as an upper layer function of the IP layer function, and a (UE) GTP-U layer function provided as an upper layer function of the UDP layer function.

In the same manner, the radio base station DeNB2 includes a physical (PHY) layer function as an X2 bearer function for the relay nodes RN in order to set the X2 bearer for the relay nodes RN, the "(RN) X2 bearer", between the relay node RN4 and the relay node RN2, and an MAC layer function provided as an upper layer function of the physical (PHY) layer function, an RLC layer function provided as an upper layer function of the MAC layer function, and a PDCP layer function provided as an upper layer function of the RLC layer function.

Furthermore, the radio base station DeNB2 include an IP layer function provided as an upper layer function of the X2 bearer function for the relay nodes RN, a UDP layer function provided as an upper layer function of the IP layer function, and a (UE) GTP-U layer function provided as an upper layer function of the UDP layer function.

Furthermore, the relay node RN2 includes a physical (PHY) layer function as an X2 bearer function for the relay nodes RN in order to set the X2 bearer for the relay nodes RN, the "(RN) X2 bearer", and an MAC layer function provided as an upper layer function of the physical (PHY) layer function, an RLC layer function provided as an upper layer function of the MAC layer function, and a PDCP layer function provided as an upper layer function of the RLC layer function.

The relay node RN2 further includes an IP layer function provided as an upper layer function of the X2 bearer function for the relay nodes RN, a UDP layer function provided as an upper layer function of the IP layer function, and a (UE) GTP-U layer function provided as an upper layer function of the UDP layer function.

Herein, an X2 bearer for the relay nodes RN, the "(RN) X2 bearer", is set for each QoS, and is provided between the relay node RN4 and the relay node RN3, between the relay node RN3 and the radio base station DeNB2, and between the radio base station DeNB2 and the relay node RN2.

Further, in a similar manner, an X2 bearer for the mobile station UE, the "(UE) X2 bearer", is also provided between the relay node RN4 and the relay node RN3, between the relay node RN3 and the radio base station DeNB2, and between the radio base station DeNB2 and the relay node RN2.

Note that operation of the above described the mobile station UE, the relay node RN, the radio base station DeNB, eNB and the mobile switching center MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the relay node RN, the radio base station DeNB, eNB and the mobile switching center MME. Also, the storage medium and the processor may be provided in the mobile station UE, the relay node RN, the radio base station DeNB, eNB and the mobile switching center MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed:

1. A mobile communication system, wherein the mobile communication system is configured such that:
   a handover process is carried out between a state in which a radio bearer is set with a relay node so as to communicate via the relay node and a radio base station and a state in which a radio bearer is set with the radio base station, and that
   between the relay node and the radio base station, an X2 bearer for a mobile station and an X2 bearer for the relay node are set, and
   the X2 bearer for the mobile station is multiplexed to the X2 bearer for the relay node.

2. The mobile communication system of claim 1, wherein a signal on the X2 bearer for the mobile station is multiplexed to a signal on the X2 bearer for the relay node.

3. A mobile communication system, wherein the mobile communication system is configured such that:
   a handover process is carried out between a state in which a radio bearer is set with a first relay node, so as to communicate via the first relay node and a radio base station and a state in which a radio bearer is set with a second relay node, so as to communicate via the second relay node and the radio base station, and that
   between the first relay node and the radio base station, a first X2 bearer for a mobile station and an X2 bearer for the first relay node are set,
   the first X2 bearer for the mobile station is multiplexed to the X2 bearer for the first relay node,
   between the second relay node and the radio base station, a second X2 bearer for the mobile station and an X2 bearer for the second relay node are set, and
   the second X2 bearer for the mobile station is multiplexed to the X2 bearer for the second relay node.

4. The mobile communication system of claim 3, wherein:
   a signal on the first X2 bearer for the mobile station is multiplexed to a signal on the X2 bearer for the first relay node, and
   a signal on the second X2 bearer for the mobile station is multiplexed to a signal on the X2 bearer for the second relay node.

5. A mobile communication system, wherein the mobile communication system is configured such that:
   a handover process is carried out between a state in which a radio bearer is set with a first relay node, so as to communicate via the first relay node, a second relay node and a radio base station and a state in which a radio bearer is set with the second relay node, so as to communicate via the second relay node and the radio base station, and that
   between the first relay node and the second relay node, a first X2 bearer for a mobile station and an X2 bearer for the first relay node are set,
   the first X2 bearer for the mobile station is multiplexed to the X2 bearer for the first relay node,
   between the second relay node and the radio base station, a second X2 bearer for the mobile station and an X2 bearer for the second relay node are set, and
   the second X2 bearer for the mobile station is multiplexed to the X2 bearer for the second relay node.

6. The mobile communication system of claim 5, wherein:
   a signal on the first X2 bearer for the mobile station is multiplexed to a signal on the X2 bearer for the first relay node, and
   a signal on the second X2 bearer for the mobile station is multiplexed to a signal on the X2 bearer for the second relay node.

7. A mobile communication system,
   a handover process is carried out between a state in which a radio bearer is set with a first relay node, so as to communicate via the first relay node, a second relay node and a radio base station and a state in which a radio bearer is set with the second relay node, so as to communicate via the second relay node and the radio base station, and that
   wherein between the first relay node and the second relay node, an X2 bearer for a mobile station and an X2 bearer for the first relay node are configured to be set, and
   wherein the X2 bearer for the mobile station is configured to multiplex to the X2 bearer for the first relay node.

8. The mobile communication system of claim 7, wherein a signal on the X2 bearer for the mobile station configured to multiplex a signal on the X2 bearer for the first relay node.

* * * * *